US012688550B1

(12) United States Patent (10) Patent No.: US 12,688,550 B1

Chen et al. (45) Date of Patent: Jul. 21, 2026

(54) MOTION COMPENSATION FOR TIME-OF-FLIGHT DEVICES

(71) Applicant: Zoox, Inc., Foster City, CA (US)

(72) Inventors: Yongzhe Chen, Santa Clara, CA (US); Robert Nicholas Moor, San Mateo, CA (US); Jonathan Solheim, Snoqualmie, WA (US); Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 258 days.

(21) Appl. No.: 18/525,036

(22) Filed: Nov. 30, 2023

(51) Int. Cl.
G06T 3/4038 (2024.01)
G06T 5/50 (2006.01)
G06T 7/254 (2017.01)

(52) U.S. Cl.
CPC .............. G06T 3/4038 (2013.01); G06T 5/50 (2013.01); G06T 7/254 (2017.01); G06T 2207/10028 (2013.01); G06T 2207/20221 (2013.01); G06T 2207/30252 (2013.01)

(58) Field of Classification Search
CPC ......... G06T 3/4038; G06T 5/50; G06T 7/254; G06T 2207/10028; G06T 2207/20221; G06T 2207/30252
See application file for complete search history.

(56) References Cited

U.S. PATENT DOCUMENTS

| | | | | |
|---|---|---|---|---|
| 10,535,138 | B2 | 1/2020 | Pfeiffer | |
| 10,649,459 | B2 | 5/2020 | Wang | |
| 11,458,912 | B2 | 10/2022 | Kroeger | |
| 2018/0307922 | A1* | 10/2018 | Yoon | G06T 7/55 |
| 2023/0306629 | A1* | 9/2023 | Cho | G06T 7/60 |
| 2024/0420289 | A1* | 12/2024 | Cho | G06T 5/70 |

* cited by examiner

*Primary Examiner* — Chan S Park
*Assistant Examiner* — Daniel C Chang
(74) *Attorney, Agent, or Firm* — Lee & Hayes, P.C.

(57) ABSTRACT

Techniques for generating high resolution images based on ToF sensor data are discussed herein. A vehicle may generate a composite image by combining multiple images, such as a first image and a second image. Since the images may be captured at different times and/or positions in the environment, to accurately combine the images, the ToF device may compensate for the motion of the vehicle. Thus, the ToF device may unproject the pixels of the first image into a three-dimensional point cloud. Further, the ToF device may update the position of the points in the point cloud. Based on the updated point cloud, the ToF device can determine a motion vector which may be applied to the first image to generate an updated image. The ToF device can determine a composite image by combining the updated image with the second image. The vehicle can be controlled based on the composite image.

20 Claims, 9 Drawing Sheets

300

Figure 3D:
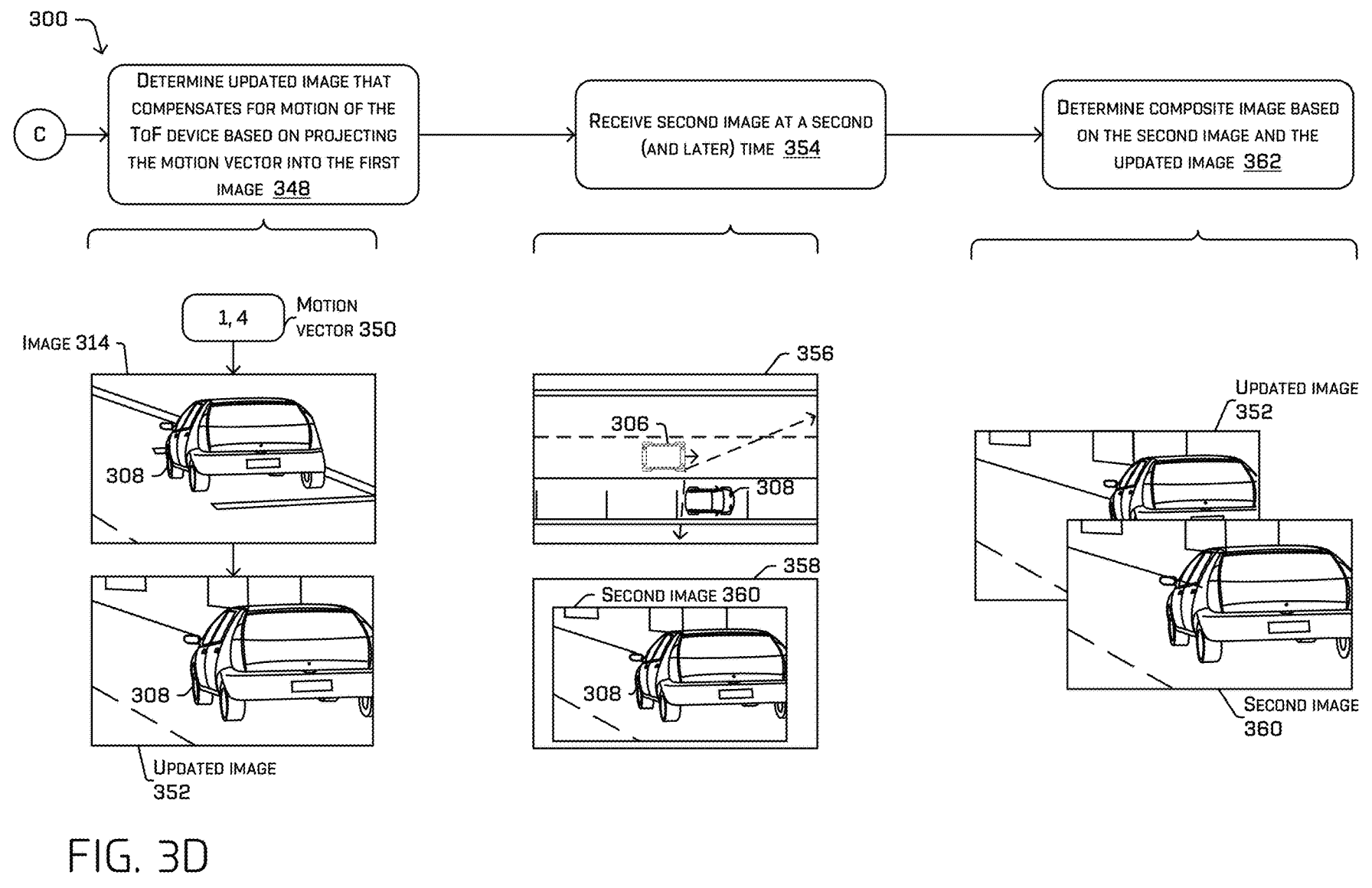

DETERMINE COMPOSITE IMAGE BASED ON THE SECOND IMAGE AND THE UPDATED IMAGE 362

UPDATED IMAGE 352

SECOND IMAGE 360

RECEIVE SECOND IMAGE AT A SECOND (AND LATER) TIME 354

356

308

306

358

SECOND IMAGE 360

308

DETERMINE UPDATED IMAGE THAT COMPENSATES FOR MOTION OF THE ToF DEVICE BASED ON PROJECTING THE MOTION VECTOR INTO THE FIRST IMAGE 348

300

C

MOTION VECTOR 350

1, 4

IMAGE 314

308

308

UPDATED IMAGE 352

Figure 4:
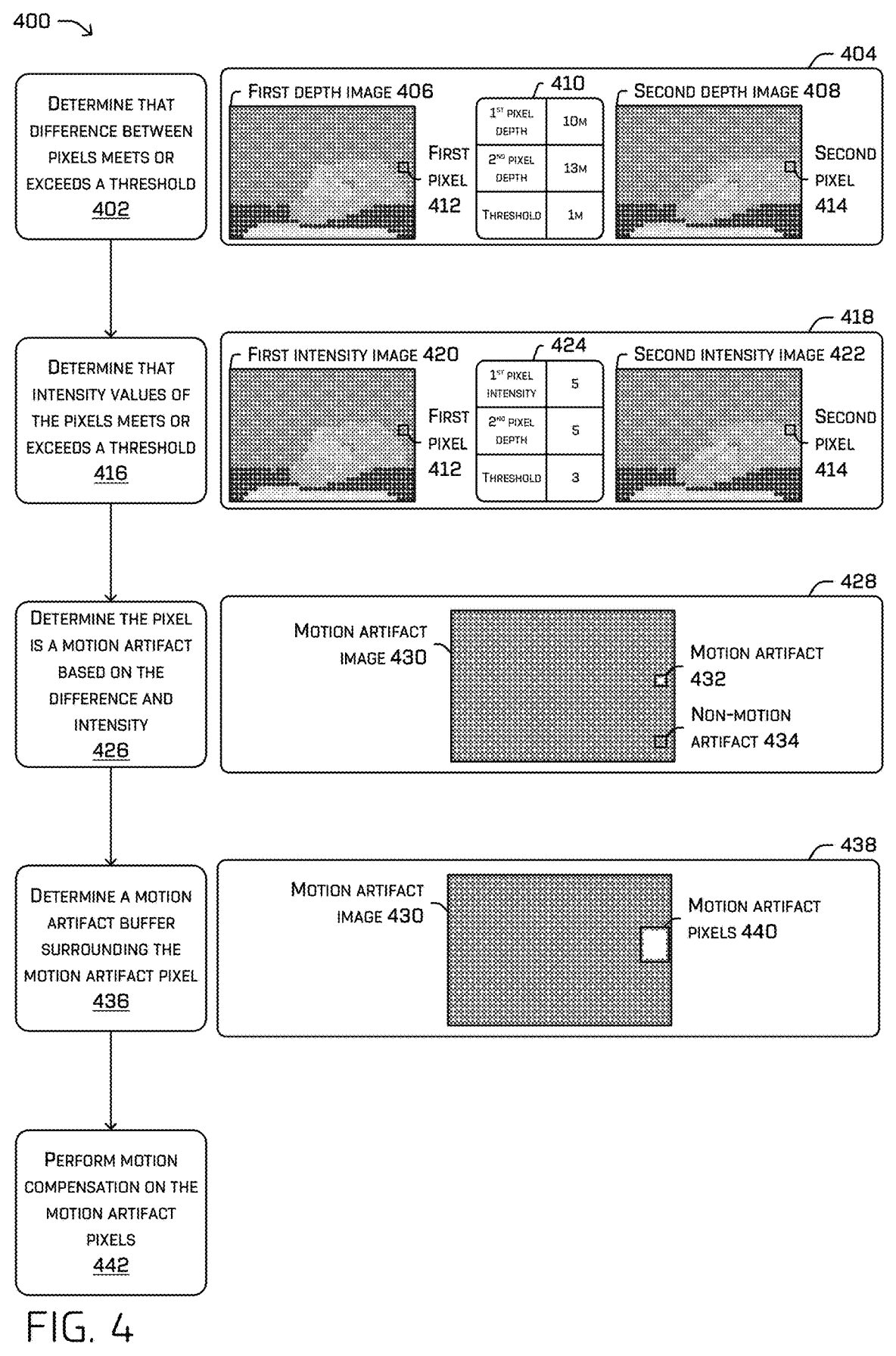

DETERMINE THAT DIFFERENCE BETWEEN PIXELS MEETS OR EXCEEDS A THRESHOLD
402

404

FIRST DEPTH IMAGE 406

410

| 1ST PIXEL DEPTH | 10M |
| 2ND PIXEL DEPTH | 13M |
| THRESHOLD | 1M |

FIRST PIXEL 412

SECOND DEPTH IMAGE 408

SECOND PIXEL 414

DETERMINE THAT INTENSITY VALUES OF THE PIXELS MEETS OR EXCEEDS A THRESHOLD
416

418

FIRST INTENSITY IMAGE 420

424

| 1ST PIXEL INTENSITY | 5 |
| 2ND PIXEL DEPTH | 5 |
| THRESHOLD | 3 |

FIRST PIXEL 412

SECOND INTENSITY IMAGE 422

SECOND PIXEL 414

DETERMINE THE PIXEL IS A MOTION ARTIFACT BASED ON THE DIFFERENCE AND INTENSITY
426

428

MOTION ARTIFACT IMAGE 430

MOTION ARTIFACT 432

NON-MOTION ARTIFACT 434

DETERMINE A MOTION ARTIFACT BUFFER SURROUNDING THE MOTION ARTIFACT PIXEL
436

438

MOTION ARTIFACT IMAGE 430

MOTION ARTIFACT PIXELS 440

PERFORM MOTION COMPENSATION ON THE MOTION ARTIFACT PIXELS
442

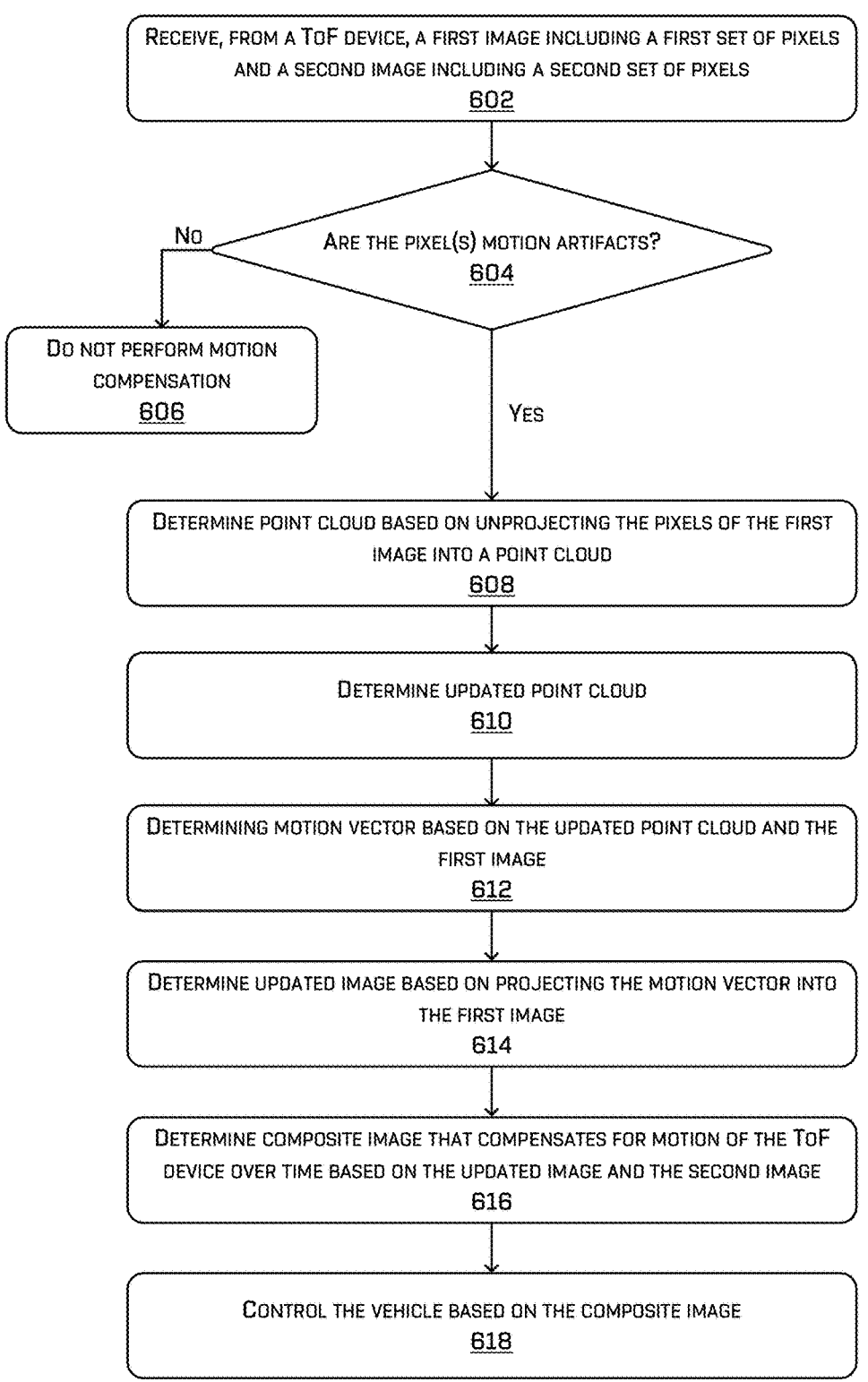

RECEIVE, FROM A ToF DEVICE, A FIRST IMAGE INCLUDING A FIRST SET OF PIXELS AND A SECOND IMAGE INCLUDING A SECOND SET OF PIXELS
602

ARE THE PIXEL(S) MOTION ARTIFACTS?
604

No

DO NOT PERFORM MOTION COMPENSATION
606

YES

DETERMINE POINT CLOUD BASED ON UNPROJECTING THE PIXELS OF THE FIRST IMAGE INTO A POINT CLOUD
608

DETERMINE UPDATED POINT CLOUD
610

DETERMINING MOTION VECTOR BASED ON THE UPDATED POINT CLOUD AND THE FIRST IMAGE
612

DETERMINE UPDATED IMAGE BASED ON PROJECTING THE MOTION VECTOR INTO THE FIRST IMAGE
614

DETERMINE COMPOSITE IMAGE THAT COMPENSATES FOR MOTION OF THE ToF DEVICE OVER TIME BASED ON THE UPDATED IMAGE AND THE SECOND IMAGE
616

CONTROL THE VEHICLE BASED ON THE COMPOSITE IMAGE
618

FIG. 6

MOTION COMPENSATION FOR TIME-OF-FLIGHT DEVICES

BACKGROUND

Sensors, such as time-of-flight (ToF) sensors, generally measure the distance from a ToF device to a surface by transmitting a light wave and receiving a reflection of the light wave from the surface, which may be read by a sensor of the ToF device. In some examples, the ToF device may receive the sensor data (e.g., light waves) while mounted to a moving system, such as when mounted to a vehicle which navigates an environment. To increase the quality of the sensor data, the ToF device may generate high resolution images by combining the sensor data captured at different timesteps. The vehicle may use such high resolution images to determine or otherwise plan vehicle actions. However, in some cases, techniques for determining composite images can result in inaccurate and/or suboptimal composite images due to, for example, the movement of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3D are pictorial flow diagrams illustrating an example technique for determining a composite image based on images captured at different times and/or positions within the environment, in accordance with one or more examples of the disclosure.

FIG. 4 is a pictorial flow diagram illustrating an example technique for identifying motion artifacts within an ToF captured image, in accordance with one or more examples of the disclosure.

FIG. 6 is a flow diagram illustrating an example technique for receiving a first image, unprojecting the first image into a point cloud, updating the point cloud, determining a motion vector based on the updated point cloud, determining an updated image based on applying the motion vector to the first image, determining a composite image based on the updated image and second sensor data, and controlling the vehicle based on the composite image, in accordance with one or more examples of the disclosure.

DETAILED DESCRIPTION

Figure 1:
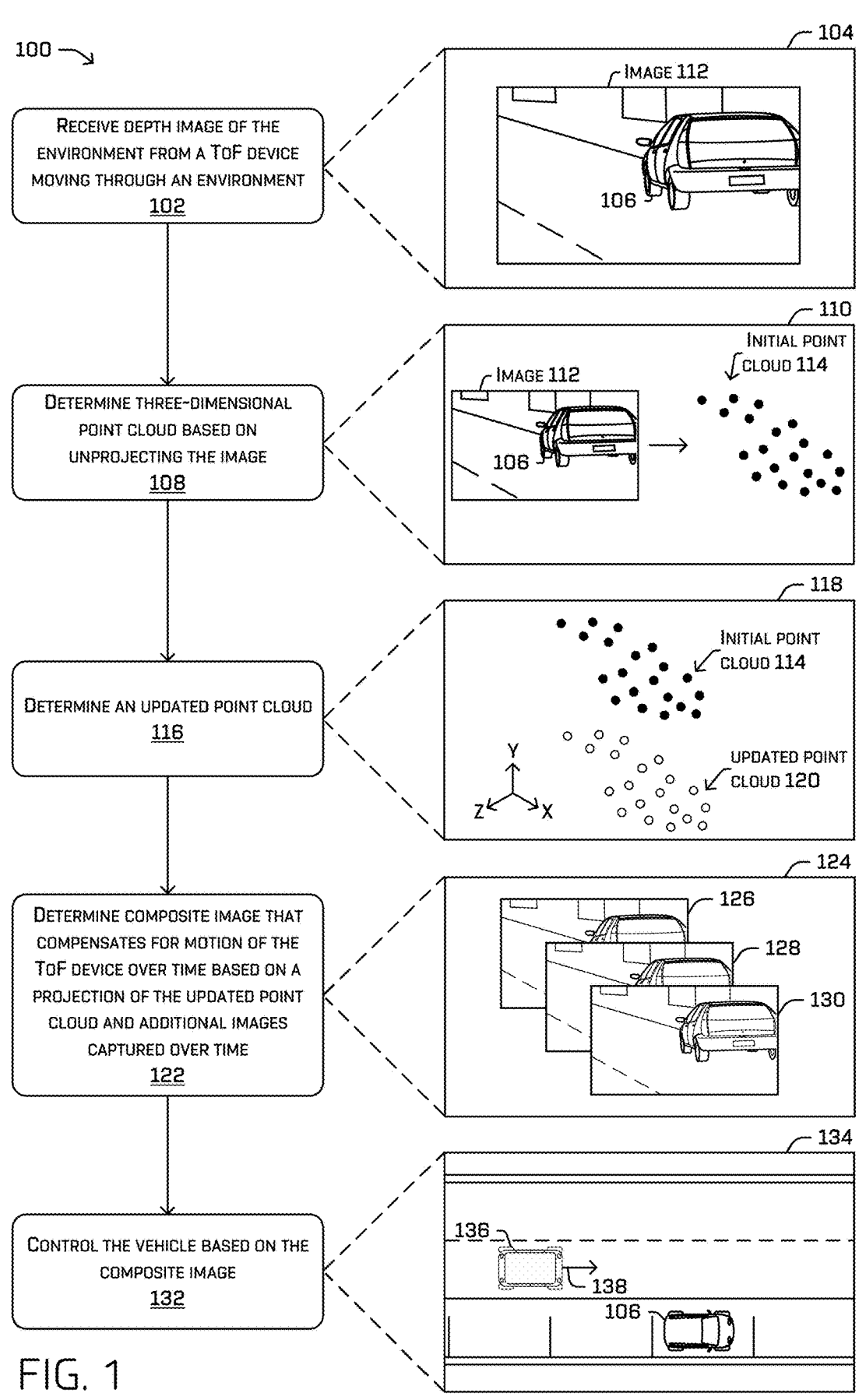
FIG. 1 is a pictorial flow diagram illustrating an example technique for compensating for motion of a sensor during image capture, which includes receiving a first image, unprojecting the first image into a point cloud, updating the point cloud, determining a composite image based on a second image and the updated point cloud, and controlling the vehicle based on the composite image, in accordance with one or more examples of the disclosure.

As described above, conventional techniques for determining a composite image can result in inaccurate and/or suboptimal images due to, for example, movement of the vehicle including one or more time-of-flight (ToF) sensors used to capture ToF sensor data. Such inaccuracies may result in suboptimal behavior of the vehicle.

Techniques for generating high resolution (or dynamic) images based on ToF sensor data are discussed herein. In some examples, a vehicle (such as an autonomous vehicle) may rely on data from a ToF device mounted thereon. Specifically, the vehicle may rely on high resolution images of the environment when determining actions for the vehicle to follow. To generate such high resolution images, the ToF device may generate a composite image by combining multiple images (or exposures), such as a first image (e.g., captured at a first time) and a second image (e.g., captured at a second (later) time). Since the images may be captured at different times and/or different positions in the environment (due to the motion of the vehicle between/during image captures), to accurately combine the first and second images, the ToF device may compensate for the motion of the vehicle. That is, in one example, the ToF device may unproject (e.g., convert the pixels from the 2D space to points in the 3D space) the pixels of the first image into a three-dimensional point cloud. Of course, use of the term unprojection in the context of a 2.5D image may simply constitute extending a ray from a frustum of the ToF device through the pixel to a given depth to determine the 3D point in the world. Further, the ToF device may update (or shift) the position of the points in the point cloud. In such instances, the ToF device may determine a motion vector based on the updated point cloud. The motion vector may represent the distance a pixel in the first image moved in a subsequent image based on the motion of the vehicle. Accordingly, the ToF device may determine an updated image based on applying the motion vector to the first image. Again, such an application operation (e.g., projection) may more broadly refer to determining the corresponding 2.5D image in the frame of reference of the second image. The ToF device can then generate the composite image (e.g., high resolution image) by combining the updated image with the second image. The ToF device may generate composite images based on any number of multiple images (e.g., two, three, four, . . . N, where N is any integer greater than or equal to two). Additionally, or alternatively, while the sequence is described as transferring data from the first image to the reference frame of the second, the techniques are not meant to be so limiting and also contemplate the reverse (i.e., transferring the second data into the reference frame of the first). In such instances, the vehicle can be controlled based at least in part on the composite image. As described in more detail below, the techniques described herein may improve safety and efficiency of systems which rely on such measurements (e.g., vehicle systems) by ensuring that accurate composite images are being used and evaluated, thereby providing a more accurate and complete understanding of the environment and enabling the vehicle to generate more efficient and accurate actions.

When generating high resolution (or high dynamic range) composite images based on ToF sensor data, conventional systems and/or techniques may be inefficient and/or lead to inaccurate or suboptimal results. For example, a ToF device may emit a light signal into the environment and receive the light signal after the signal has reflect off one or more surfaces in the environment. In such instances, the ToF device may receive a first image of the environment at a first time and a second image of the environment at a second (and, in some cases, subsequent) time. The ToF device may generate a high resolution image of the environment by combining the first and second images into a single composite image. Combining images from multiple time steps can create a densely pixelated image that has a higher resolution level. However, techniques used to combine such images may result in an inaccurate composite image. For instance, since the ToF device may be mounted on a vehicle, the ToF device may capture the images while the vehicle is moving. As such, the first image may be captured at a first time at a first location in the environment and the second image may be captured at a later time at a second (and different) location. Thus, when using conventional techniques to combine these images to create a high resolution image, the first and second images may not line up (or match). That is, since the ToF device may be at different positions in the environment when the first and second images are captured (e.g., relative to objects in the environment being captured), the objects in such images may be located at different positions within the 2D images. Thus, when the first and second images are combined, the objects may be a different locations in the image which may result in the composite image being inaccurate (e.g., including motion artifacts or noise). Inaccurate composite images can result in the vehicle performing actions based on the belief that the surface is in a certain location when the surface is actually in a different location. Further, such inaccurate composite images may reduce the accuracy and/or confidence of object detections and/or classifications as well as object motion prediction and/or tracking. In addition to the safety concerns, such inaccuracies may result in the vehicle having a lower confidence in the position and/or motion of the objects in the environment which may cause the vehicle to take overly caution and/or conservative actions. As such, the limitations of the conventional techniques may impede object detection, classification, and motion prediction, which may result in the vehicle performing suboptimal actions.

To address these and other technical problems and inefficiencies, the systems and/or techniques described herein include a sensor management system (which also may be referred to as a "sensor management component" or "sensor manager") configured to generate high resolution images based on ToF sensor data which compensate for motion of the sensor during image capture. Technical solutions discussed herein solve one or more technical problems by allowing ToF devices to avoid determining and/or using inaccurate and/or suboptimal composite images.

In some examples, a sensor management component may emit a continuous, modulated light signal (e.g., carrier) from one or more ToF devices. In some examples, the vehicle may include multiple ToF devices configured to receive sensor data representative of the driving environment. Such ToF devices may be located or otherwise mounted at any location in or on the vehicle. Further, such ToF devices may include one or more emitters (e.g., vertical cavity surface emitting laser (or VCSEL)) configured to emit light waves (e.g., square waves, sinusoidal waves, a combination of square and sinusoidal waves, etc.) into the environment. That is, the vehicle may include multiple ToF devices located at various different positions and/or angles, and such ToF devices may each contain multiple emitters. In some examples, the emitter may emit continuous light signals or one or more discrete, periodic light signals.

In some examples, the sensor management component may receive a second light signal from a ToF receiver. The ToF device may include a sensor receiver (e.g., CMOS sensor) configured to capture or otherwise receive light signals after such signals have exited the ToF device and reflected off object(s) in the environment. In some examples, the sensor receiver may be located horizontally adjacent to the emitter(s). That is, the second sensor receiver may be positioned side-by-side with the light emitter of the ToF device. In such instances, after the ToF emitter emits a light signal into the environment, the signal may reflect off one or more objects and return to the sensor receiver of the ToF device. In some examples, the received light signals may have a same or different phase.

In some examples, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor management component (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In such instances, the intensity image and the depth image may be represented in the two-dimensional space (or domain).

In some examples, the sensor management component may receive and/or determine multiple images at different times and/or different locations within the environment. That is, the sensor management component may continuously receive images from the ToF device while the vehicle navigates the environment. As such, the sensor management component may receive a first image and a second image that may be captured serially by the ToF device and at different locations in the environment. In such instances, the ToF device may capture the first image at a time $T_0$ at a first location. Further, the ToF device may capture the second image at a time $T_1$ at a second and different location.

In some examples, the sensor management component may determine a high resolution composite image by combining the first and second images. In such instances, the sensor management component may perform operations on the first image to compensate for the motion of the vehicle such that the first and second images may be combined. As described below, such motion compensation techniques may include unprojecting the image such that the sensor management component may determine the relative distance the object (in the first and second images) moved in the 3D space and leverage such information to determine how far the object moved in the 2D space (e.g., imaging pane).

In some examples, the sensor management component may perform an unprojection operation on the pixels of the first image. The unprojection operation may covert a 2D image into a 3D point cloud. In this example, unprojecting the first image may convert individual pixels (of the first image) from the 2D space into perspective points in a multi-dimensional point cloud where each point in the point cloud has a coordinate (e.g., x-position, a y-position, and a z-position). The sensor management component may unproject the first image based on one or more intrinsics and/or extrinsics of the ToF device. In this example, the ToF device intrinsics may indicate that an image captured by the ToF device may include an imaging plane of 360×480 pixels, lens parameters, focal points, etc. Of course, in other examples the dimensions and/or the number of pixels of the imaging plane may differ. In this instance, the intrinsics may inform, for each pixel in the imaging plane, the angle (e.g., azimuthal, elevation, and/or polar angle) from which light waves are received from the 3D environment. For example, the intrinsics may indicate that any light being received by the ToF device from an angle of 30 degrees azimuth and 35 degrees elevation (relative to the ToF device) will be represented in the imaging plane at pixel X (e.g., index 90, 90). Accordingly, each pixel in the image may include an angle measurement (e.g., indicating the angles from which light is received), a depth measurement (e.g., indicating the depth of the surface from which the light signal reflected), and/or an intensity value (e.g., indicating the degree of reflectivity of the surface). As such, when the sensor management component unprojects the first image, the sensor management component may use the angle and depth measurements of the pixels to determine the coordinates of each point in the point cloud.

In some examples, the sensor management component may determine a displacement vector which may be used to update the position of the points in the point cloud. The displacement vector may represent or identify the distance the object appears to have moved in the three-dimensional environment based on the motion of the vehicle. The sensor management component may use the displacement vector to update the position (e.g., the x-coordinate) of the points in the point cloud to compensate for the motion of the vehicle. The sensor management component may determine the displacement vector based on (e.g., the product) a motion of the vehicle and/or an exposure time (e.g., the time that the ToF device receives light for a single image (or exposure)). In some examples, the sensor management component may determine the exposure time based on the ToF device settings. Further, the sensor management component may determine the velocity of the vehicle by receiving velocity data from one or more components of the vehicle external to the ToF device, or by determining the velocity based on the ToF sensor data.

In some examples, the sensor management component may update (or modify) the position of the point cloud based on the displacement vector. Updating the position of the point cloud may result in shifting the location of the points in the point cloud to compensate (or account) for the motion of the vehicle. As noted above, the points in the point cloud may include a coordinate (e.g., x-position, a y-position, and a z-position) relative to the ToF device or the vehicle. In this example, the sensor management component may update the points by updating the x-position (or the y-position and/or the z-position) of each point based on the displacement vector. That is, the sensor management component may add the displacement vector value to the x-position value which may result in shifting the position of the point in the 3D space. The sensor management component may perform such operations on some or all points in the point cloud. Accordingly, the sensor management component may determine an updated point cloud based on applying the displacement vector to the points in the point cloud.

In some examples, based on determining the distance the object moved in the 3D environment (e.g., relative to the vehicle), the sensor management component may use such information (the updated point cloud) to determine a motion vector in the 2D space that represents the distance the object and the associated pixels moved in the image plane.

For example, the sensor management component may determine the motion vector based on the intrinsics and/or extrinsics of the ToF device, the updated point cloud, and the first image. In such instances, the sensor management component may determine the motion vector based on subtracting the updated pixel index from the original pixel index. The sensor management component may identify the updated pixel index based on leveraging ToF device intrinsic data. As described above, the intrinsics of a ToF device may indicate, for each pixel in the imaging plane, the angle(s) from which light waves are received. That is, each pixel in the image may include angle data indicating the angle(s) from which the data stored therein was received, which may be used to determine the location in the 3D environment of an object represented by the data. Accordingly, the sensor management component may determine the azimuth and elevation angles from a point in the updated point cloud to the ToF device. Based on determining the angle(s) corresponding to the point in the updated point cloud, the sensor management component may access ToF device intrinsic data to determine which pixel in the first image has an angle similar or identical to the angle(s) corresponding to the point in the updated point cloud. In such instances, based on identifying the corresponding pixel in the first image, the sensor management component may identify the index of the pixel which may be indicative of the updated pixel index. The updated pixel index may represent the updated location of the data from the environment based on the motion of the vehicle. Accordingly, the sensor management component may determine the motion vector by subtracting the updated pixel index from the original pixel index. The difference of the pixel indices may be the motion vector.

In some examples, the sensor management component may determine an updated image based on applying the motion vector to the first image. Applying the motion vector to the first image may cause the pixels and the data stored therein to shift within the image pane. The sensor management component may determine the updated image based on adding the data of the motion vector to the indices of the pixels in the first image. The resulting updated image may include the object(s) from the first image but at different locations within the image pane of the updated image. That is, the locations of the object(s) in the updated image may correspond to those of the second image (which was captured at a subsequent time from the first image).

In some examples, the sensor management component may determine a composite image based on the updated image and the second image. Based on determining the updated image, the sensor management component may perform image combining techniques to combine the updated image with the second image. Though the updated image was captured at a previous time, the motion compensation techniques described above may update the pixels and the data stored therein to ensure that the updated image and the second image are similar or identical.

Although the techniques described above include performing the motion compensation operations on all pixels of the first image, in other examples the sensor management component may perform such techniques on a portion (e.g., a subset less than all) of the pixels. For instance, the sensor management component may perform such operations on a portion of the pixels corresponding to pixels identified as motion artifacts, pixels associated with a region of interest (e.g., regions that could affect operation of the vehicle), and/or objects of interest (e.g., dynamic objects within a threshold distance of the vehicle). That is, the sensor management component may identify pixels in the first image that are likely or expected to be located at a different location in a subsequently captured image. Such pixels may be tagged or otherwise identified as a motion artifact. The sensor management component may perform the motion compensation operations on the pixels identified as motion artifacts. Specifically, the sensor management component may identify a first pixel at a first index in the first image and a second pixel at the same index in the second image. The sensor management component may determine whether the difference between the depth values of the first and second pixels meet or exceed a threshold value. If the difference meets or exceeds the threshold value, the sensor management component may identify the first and second pixels as a motion artifact and may perform the motion compensation on such pixels. In contrast, if the difference is below the threshold value, the sensor management component may indicate that the first and second pixels are not motion artifacts and may not perform the motion compensation operations on such pixels. Accordingly, the sensor management component may perform the motion compensation techniques on the pixels identified as motion artifacts while refraining from performing such operations on the non-motion artifact pixels.

Although the operations described above are performed with respect to an indirect ToF sensor device, such operations may also be performed on the sensor data by a direct ToF device, such as a lidar device.

The techniques described herein can improve the functioning, safety, and efficiency of the autonomous and semi-autonomous vehicles operating in various driving environments, as well as the functioning and/or efficiency of the ToF device. Compensating for the motion of the vehicle when combining ToF data based on vehicle motion data and exposure times may allow the ToF device to determine composite images of the environment more efficiently and accurately (e.g., less computationally expensive than prior approaches). Accordingly, the increased efficiency and accuracy of the ToF device may increase the functioning, safety, and efficiency of the vehicle as the vehicle may be able to generate more accurate and efficient actions for the vehicle to follow based on the data received from the ToF device. In other examples, performing motion compensation techniques on a subset of the pixels identified as motion artifacts may reduce the computational complexity (e.g., reduces the number of pixels on which the sensor management component performs the motion compensation).

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. In another example, the techniques may be utilized in connection with a wearable device to compensate for motion of the wearable device during image capture. Additionally, the techniques described herein may be used with real data (e.g., captured using sensor(s)), simulated data (e.g., generated by a simulator), or any combination of the two.

FIG. 1 is a pictorial flow diagram illustrating an example process 100 for receiving a first image, unprojecting the first image into a point cloud, determining an updated point cloud based on the point cloud, determining a composite image based on a second image and the updated point cloud, and controlling the vehicle based on the composite image. As shown in this example, some or all the operations in the example process 100 may be performed by a sensor management component integrated into a ToF device and/or within a perception component, a prediction component, a planning component, and/or any other components and systems within the autonomous vehicle. For instance, as shown in this example, example process 100 may be implemented using a sensor management component. As described below in more detail, the sensor management component may include various components, such as a motion artifact component, an unprojecting component, a point cloud modifying component, an image updating component, and/or an exposure combining component which may be configured to determine composite images that compensate for the vehicle's motion.

At operation 102, the sensor management component may receive a depth image of the environment from a ToF device moving through an environment. In some examples, a vehicle may include one or more sensor devices mounted at various locations. Such sensor devices may be configured to capture data representative of the environment proximate the vehicle. In some instances, one or more of the sensor devices may be a ToF sensor device. The ToF sensor device(s) may include one or more emitters configured to emit continuous, modulated light signals into the environment. Such signals may reflect off various objects in the environment prior to returning to a sensor receiver of the ToF sensor device. Further, the sensor management component may determine a depth and/or intensity image based on the received sensor data. For example, box 104 illustrates a two-dimensional image of the environment proximate the vehicle. In this example, the box 104 may include an image 112 (e.g., 2D image). In some instances, the image 112 may include a plurality of pixels (not shown) that contain data associated with the environment. Furter, the image 112 may include an object 106. As shown, the object 106 may be a vehicle; however, in other examples, the object may be any other type of static or dynamic object. In other examples, the image 112 may include more or fewer objects.

At operation 108, the sensor management component may unproject the image into a point cloud (e.g., 3D space). In some examples, the sensor management component may combine multiple images captured from different timesteps. That is, the sensor management component may generate a high resolution image by combining the image 112 and one or more additional images captured at subsequent times and/or locations. To ensure that such images may be accurately combined, the sensor management component may compensate for the motion of the ToF device (due to the motion of the vehicle). That is, since the ToF device may be moving, the object 106 in the image 112 and the same object 106 in subsequently received images may be located at different locations in the different imaging panes based on the relative location of the ToF device to the object 106. Accordingly, the sensor management component may compensate for the movement of the vehicle such that the image 112 and subsequently received images may be effectively and/or accurately combined. The motion compensation techniques may include unprojecting the image such that the sensor management component may determine the relative distance the object 106 moved in the 3D space and leverage such information to determine how far the object 106 moved in the 2D space (e.g., imaging pane).

For example, the sensor management component may unproject the image 112 into a multi-dimensional space. As shown, box 110 illustrates the image 112 and an initial point cloud 114. In this example, the sensor management component may determine the location of the points in the initial point cloud 114 based on the depth data and the ToF intrinsic data. That is, the ToF device may include intrinsic data that indicates the angle(s) from which light waves may be received from the 3D space. As such, the sensor management component may determine the location of the points in the initial point cloud 114 based on the angle(s) (relative to the ToF device), any lens parameters, and the depth measurements, as well as any other intrinsic value.

At operation 116, the sensor management component may determine an updated point cloud. As described above, the sensor management component may update the initial point cloud 114 to represent the distance the object moved (relative to the ToF device) in the 3D space between the time at which the ToF device received the image 112 and the time at which the ToF device received the subsequent image. For example, box 118 illustrates multiple point clouds. That is, the box 118 may include the initial point cloud 114, as determined at operation 108. Further, box 118 may include an updated point cloud 120. The updated point cloud 120 may be determined based on the initial point cloud 114. Specifically, the sensor management component may determine the updated point cloud 120 based on applying a displacement vector to some or all points in the initial point cloud 114. The displacement vector may represent the distance the object has moved in the 3D environment based on the motion of the ToF device. The sensor management component may determine the displacement vector based on the ToF velocity data (e.g., similar to the vehicle velocity data) and the time of the ToF exposure. The velocity data may be determined based on a motion of the vehicle upon which the TOF device is located or mounted. That is, the sensor management component may determine the motion data by receiving velocity, acceleration, and/or any other type of motion data from the vehicle. Further, the sensor management component may determine whether an exposure time-velocity ratio meets or exceeds a threshold. In some examples, if the ratio meets or exceeds a threshold, the sensor management component may determine that the motion compensation techniques may not be performed. In contrast, if the ratio is below a threshold, the sensor management component may determine that the motion compensation technique may be performed and as such, the sensor management component may apply the displacement vector to the initial point cloud 114. In this example, the sensor management component may add the displacement vector value to the coordinate of each point in the initial point cloud 114. The result of using the displacement vector to update or otherwise modify the initial point cloud 114 may be the updated point cloud 120. Additional details regarding determining displacement vectors and/or updated point clouds are discussed with respect to FIGS. 2 and 3A.

In some examples, the sensor management component may determine a motion vector based on the updated point cloud 120 and the ToF intrinsic data. That is, sensor management evaluate the updated point cloud 120 and the ToF intrinsics to determine how far the object 106 moved in the 2D space. The sensor management component may determine the distance the object 106 moved in the imaging plane based on subtracting the index of a pixel in the image 112 from the updated index of the same pixel based on the updated point cloud 120. The sensor management component may determine the pixel indices based on ToF intrinsics. As described in operation 108, the ToF intrinsics may identify, for each pixel, an azimuth and elevation (or polar) angle from which light signals are received by the ToF device from the 3D environment. As such, based on determining the angle(s) from a point in the updated point cloud 120 to the ToF device, the sensor management component may access intrinsic data to determine which pixel is associated with the angle(s). Based on identifying the associated pixel, the sensor management component may identify the index (updated index) of the pixel and compare the updated index to the index of the pixel in the image 112. The difference between such indices may be a motion vector. In some examples, the sensor management component may perform such operations on one or more pixels such that the motion vector is an average of the difference between multiple original and updated pixels.

In some examples, the sensor management component may determine an updated image based on applying the motion vector to the image 112. Applying the motion vector into the image 112 may shift the pixels and the data associated thereto to a different index in the imaging pane. The sensor management component may apply the motion vector to the image 112 by adding the motion vector values to the index of the pixels in the image 112.

At operation 122, the sensor management component may determine a composite image that compensates for the motion of the ToF device over time based on a second image and the updated point cloud. Based on determining an updated image that compensates for the motion of the ToF device, the sensor management component may generate a high resolution composite image by combining the updated image to one or more subsequent images. For example, box 124 illustrates multiple images being combined into a high resolution image. In this example, the box 124 may include the image 126, the image 128, and the image 130. The image 126 may be the updated image described above, image 128 may be correspond to sensor data captured at time after that of the ToF device capturing the image 112. Further, the image 130 may correspond to sensor data captured at a time after that of the image 126 and/or image 128.

At operation 132, the sensor management component may control the vehicle based on the composite image. In some examples, upon generating the composite image at operation 122, the sensor management component may send the composite image to one or more downstream processing components or systems. Such components or systems may include one or more additional perception components, one or more prediction components, and/or one or more planning components. As such, the vehicle may determine or otherwise plan vehicle actions based on the composite image. In this example, box 134 illustrates a vehicle following a trajectory proximate the object 106. The vehicle 136 may be the same vehicle described in operation 102 upon which the ToF device may be mounted. In such instances, the vehicle 136 may analyze the composite image and determine a trajectory 138 that instructs the vehicle 136 how to navigate throughout the environment. In this manner, the vehicle may be controlled based at least in part on the composite image.

Figure 2:
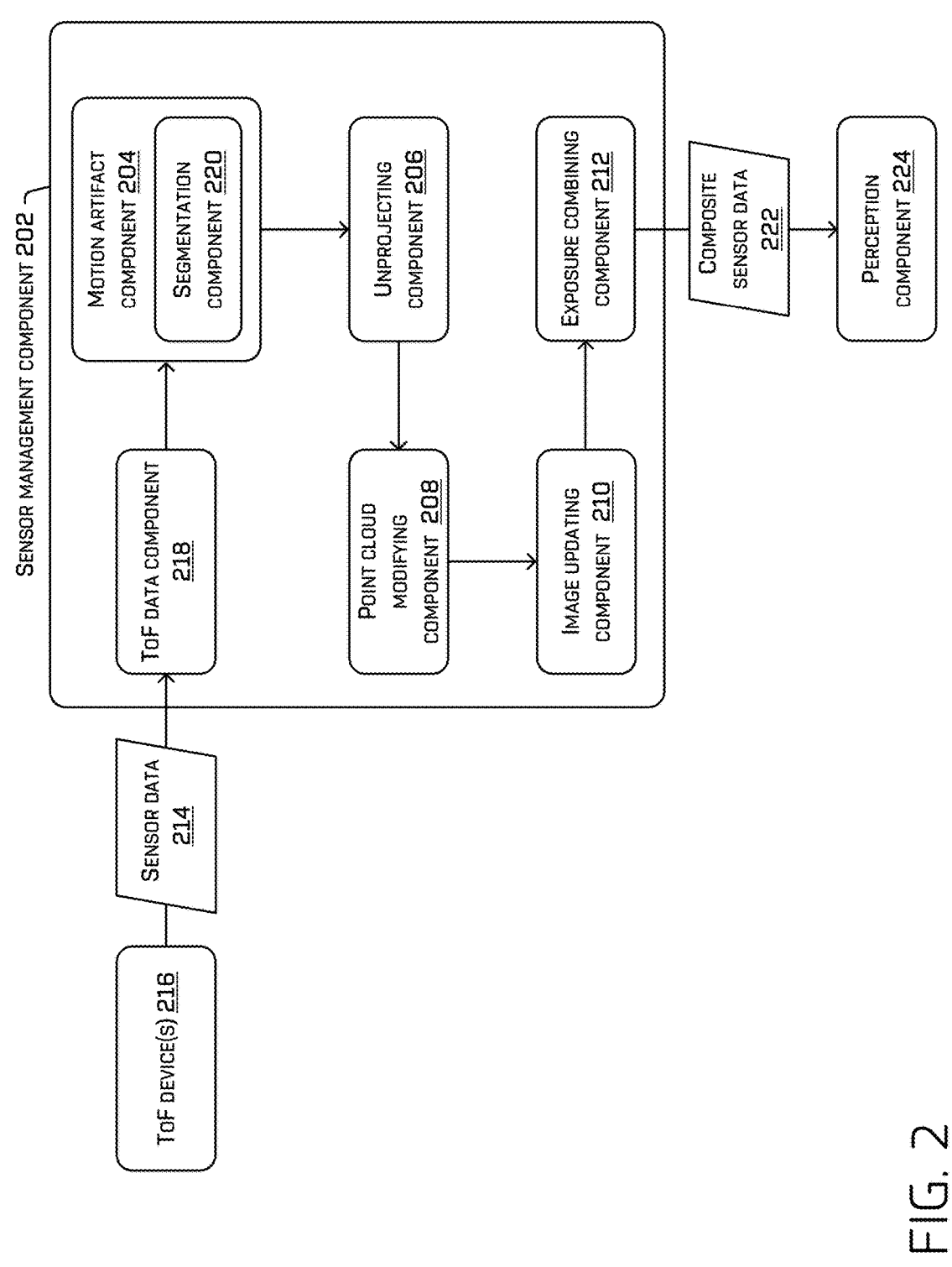
FIG. 2 illustrates an example computing system including a sensor management component configured to compensate for movement of a vehicle including a ToF sensor when generating a composite image using ToF sensor data, in accordance with one or more examples of the disclosure.

FIG. 2 illustrates an example computing system 200 including a sensor management component 202 configured to compensate for vehicle movement when generating a composite image using ToF sensor data.

In some examples, the sensor management component 202 may be similar or identical to the sensor management component described above, or in any other examples herein. As noted above, in some cases the sensor management component 202 may be implemented within or otherwise associated with a perception component, prediction component, and/or planning component of an autonomous vehicle. In some examples, the sensor management component 202 may include various components described below, configured to perform different functionalities of a motion compensation technique. For instance, the sensor management component 202 may include a motion artifact component 204 configured to identify motion artifacts in an image, an unprojecting component 206 configured to perform an unprojection operation on the image, a point cloud modifying component 208 configured to modify a point cloud to compensate for the motion of a vehicle, an image updating component 210 configured to perform a motion vector application operation on the updated (or modified) point cloud, and/or an exposure combining component 212 configured to determine a composite image based on the updated image and a second image.

In some examples, the sensor management component 202 may receive sensor data from one or more sensor device(s) within (or otherwise associated with) an autonomous vehicle. Different ToF device(s) 216 may be mounted or installed at different locations on the vehicle, and may include various types of ToF devices (e.g., direct ToF, indirect ToF, etc.) providing various elements (or parameters) to the sensor management component 202. For example, the sensor management component 202 may receive sensor data 214 from one or more ToF device(s) 216. In some examples, the ToF device may be mounted or installed at different locations on and/or within the autonomous vehicle. The ToF device(s) 216 may be configured to receive light signals after such signals have reflected off surfaces in the environment. As shown in FIG. 2, the sensor data 214 may be provided to the sensor management component 202. In some examples, the sensor management component 202 may include a ToF data component 218 configured to receive, store, and/or synchronize received sensor data 214 from the ToF device(s) 216.

In some examples, the sensor management component 202 may include a motion artifact component 204 configured to identify motion artifacts within an image. The motion artifact component 204 may receive ToF sensor data 214 from the ToF data component 218. The motion artifact component 204 may evaluate the sensor data 214 to determine whether such data includes motion artifacts. A motion artifact may be a pixel that includes data likely to move locations in the imaging plane from one image to a subsequently captured image. The motion artifact component 204 may identify motion artifacts by comparing the depth values and/or distances associated with two images. That is, the motion artifact component 204 may receive a first image at a first time and a second image at a second time. The motion artifact component 204 may identify a first pixel at a specific index (e.g., <u, v> coordinate in image space) in the first image and second pixel at the same index in the second image. The motion artifact component 204 may compare the depth value of the first pixel with the depth value of the second pixel. If the result of the comparison meets or exceeds a threshold, the motion artifact component 204 may determine that the first and second pixels and the data associated thereto may be considered motion artifacts. Conversely, if the result of the comparison is below a threshold value, the motion artifact component 204 may determine that such pixels are not motion artifacts. Additionally or alternatively, the motion artifact component 204 may also identify motion artifacts by determining whether the result meets or exceeds a threshold. In some examples, the motion artifact component 204 may determine that if the result meets or exceeds the threshold that the first and second pixels may correspond to different objects in the three-dimensional environment. Based on such a determination, the motion artifact component 204 may indicate that such pixels are not motion artifacts but rather separate objects.

In some examples, the motion artifact component 204 may perform one or more additional techniques to ensure that the data stored in the first and second pixels are reliable. For example, the motion artifact component 204 may compare the intensity value of the first pixel and the intensity value of the second pixel to a threshold. If one or both intensity values meet or exceed the threshold, the motion artifact component 204 may determine that the pixel and the data associated therewith is reliable (e.g., likely from the same source). Conversely, if one or both intensity values are less than the threshold, the motion artifact component 204 may determine that the pixels and the data associated therewith is not reliable. In either such case, the intensity may be modified by the associated distance to compensate for distance effects on illumination. In such cases, the pixels may be considered non-motion artifacts and may be excluded from the motion compensation techniques described above.

In some examples, the motion artifact component 204 may determine a buffer of pixels tagged as motion artifacts surrounding the first and second pixels. For example, based on determining that the first and second pixels are motion artifacts, the motion artifact component 204 may identify one or more pixels surrounding (e.g., directly or indirectly) the first and second pixels. In such instances, the motion artifact component 204 may tag or otherwise identify such surrounding pixels as motion artifacts. In some examples, the motion artifact component 204 may send the pixels tagged as motion artifacts to one or more components within the sensor management component 202. Such components may perform various motion compensation techniques on the pixels. However, this is not intended to be limiting; in other examples, the motion artifact component 204 may send all pixels in the images to the various components and such components may perform motion compensation on all pixels in the image.

In some examples, the motion artifact component 204 may include one or more subcomponents such as a segmentation component 220. The segmentation component 220 may be configured to identify motion artifacts based on using semantic segmentation techniques. Specifically, the segmentation component 220 may analyze the ToF sensor data to identify objects and/or pixels which may be considered motion artifacts. Such objects and/or pixels may include objects that have a velocity value that is different than that of the vehicle. Example techniques for identifying motion artifacts based on semantic segmentation can be found, for example, in U.S. Pat. No. 10,458,912, issued Oct. 4, 2022, and titled "Sensor Validation Using Semantic Segmentation Information," and in U.S. Pat. No. 10,535, 138, issued Jan. 14, 2020, and titled "Sensor Data Segmentation," each of which is incorporated by reference in its entirety and for all purposes. As non-limiting examples of which, pixels associated with a particular object type may be marked for inclusion or exclusion of the techniques described herein. As a particular example, pixels associated with vehicles, pedestrians, bicyclists, etc., may be ignored because discrepancies may be based on the motion of those objects and not the vehicle. In similar examples, additional output may be used to further compensate for those object types, such as tracking and/or prediction data to estimate and, therefore, compensate for the motion of those objects relative to the vehicle.

In some examples, the sensor management component 202 may include an unprojecting component 206 configured to perform an unprojection operation on the image. The unprojecting component 206 may receive pixels tagged as motion artifacts from one or more images associated with the sensor data 214. In such instances, the unprojecting component 206 may unproject the motion artifact pixels and/or images into a multi-dimensional space where each point includes a coordinate (e.g., x-position, y-position, and z-position). The unprojecting component 206 may leverage one or more ToF device intrinsics to determine the coordinates of each pixel in the 3D space. For example, the ToF intrinsics may identify, for each pixel in the image, an azimuth and elevation angle from which light signals are received. In such instances, the unprojecting component 206 may determine the location of each pixel in the 3D space based on the angle(s) and the depth values.

In some examples, the sensor management component 202 may include a point cloud modifying component 208 configured to modify a point cloud to compensate for the motion of a vehicle. The point cloud modifying component 208 may receive the initial point cloud from the unprojecting component 206. In some examples, the point cloud modifying component 208 may determine an updated point cloud based on applying a displacement vector to the coordinates of some or all points in the initial point cloud. The displacement vector may be determined based on the velocity of the vehicle, the time of the ToF exposure, the relative vector between points of a same or similar index, etc. The updated point cloud may represent the updated location of the reflective surfaces based on the motion of the ToF device.

In some examples, the sensor management component 202 may include an image updating component 210 configured to perform a motion vector application operation on the updated (or modified) point cloud. The image updating component 210 may receive the updated point cloud from the point cloud modifying component 208. In some examples, the image updating component 210 may determine an updated image based on applying a motion vector to the first (or initial) image. The updated image may compensate for the motion of the ToF device. The image updating component 210 may determine the motion vector based on identifying an azimuth and elevation angle between a point in the updated point cloud and the ToF device, identifying an updated pixel in the first image associated with the angle(s), identifying the index of the pixel, and/or determining a difference (e.g., subtract) between the index of the pixel in the first image and the index of the updated pixel.

Based on determining the motion vector, the image updating component 210 may apply the motion vector to the first image. In such instances, the result of the application operation may be an updated image that compensates for the motion of the vehicle. When applying the motion vector to the first image, the image updating component 210 may add the motion vector values to the indices of the pixels. In some examples, when applying the motion vector to the first image, the image updating component 210 may interpolate the values of one or more of the pixels. That is, since applying the motion vector to the first image may expose gaps between shifted and unshifted pixels, the image updating component 210 may interpolate between such pixels such that pixels in such gaps are assigned pixel data. The interpolation may include determining an average of the depth, intensity, and/or any other value between neighboring pixels. Additional discussion about determining motion vector and/or applying the motion vector to images are described in FIGS. 3B-3D. In some examples, the sensor management component 202 may include an exposure combining component 212 configured to determine a composite image based on the updated image and a second image.

As noted above, the exposure combining component 212 may send the composite sensor data 222 (e.g., the composite image) to the perception component 224 for further processing. In such instances, the perception component 224 may analyze and/or evaluate the composite sensor data 222 when identifying and/or classifying objects in the environment, determining characteristics of and predicted actions for the objects, and/or determining actions for the vehicle to follow throughout the environment.

FIGS. 3A-3D are pictorial flow diagrams illustrating an example process 300 for determining a composite image based on images captured at different times and/or positions within the environment. In this example, some or all operations in the example process 300 may performed by a sensor management component integrated into a ToF device and/or within a perception component, a prediction component, a planning component, and/or any other components and systems within the autonomous vehicle. Further, the sensor management component described in FIGS. 3A-3D may be similar or identical to the sensor management component, as described throughout.

At operation 302, the sensor management component may receive a first image from a ToF sensor device moving through an environment. In some examples, the sensor management component may receive images (e.g., sensor data) captured by a ToF device mounted on vehicle moving throughout a driving environment. As such, images captured by the ToF device may be captured at different times and/or different locations (due to the vehicle's motion) within the environment. For example, box 304 illustrates a top down perspective of a driving scenario. Specifically, box 304 illustrates an autonomous vehicle 306 navigating a driving environment and approaching an object 308. As shown, the vehicle 306 may be navigating in a direction toward the object 308. In this example, the object 308 may be a vehicle parked along the side of a road upon which the vehicle 306 is navigating; in other examples, the object 308 may be any other type of dynamic or static object.

In various examples, the autonomous vehicle 306 may be configured to receive ToF sensor data from a single ToF device or any number of ToF devices configured to capture images (or exposures) of a driving environment. As shown in box 304, the ToF device may be mounted or installed on a leading corner of the vehicle 306; however, in other examples, the ToF device may be located at any other location in or on the vehicle 306. The ToF device may include a field of view 310 which may define the region of the environment that is viewable (or observable) to the ToF device. As shown, the field of view 310 of the ToF device may include the region between the dashed lines. As such, objects within the field of view 310 may be included in the image (e.g., sensor data) received by the ToF device. Further, the location of the objects in the 2D image may be based on the location of the objects in the 3D environment with respect to the field of view 310.

For example, box 312 illustrates an image 314 captured by the ToF device described in box 304. In this example, the image 314 may correspond to the sensor data received by the ToF device at the time and location as represented in box 304. As shown, the image 314 may include the object 308. The location of the object 308 within the 2D image 314 may be based on the location of the object 308 in the field of view 310 in the 3D environment. In this instance, the object 308 may be located substantially in the middle of the field of view 310 and as such, the object 308 may be located substantially in the middle of the image 314.

At operation 316, the sensor management component may determine an updated point cloud based on unprojecting the first image into a point cloud. As described above, since the ToF device may be mounted on a moving vehicle, the images may be captured at different times and/or different locations. Accordingly, the sensor management component may perform various motion compensation techniques to ensure that such images may be accurately combined. As such, the sensor management component may unproject the image 314 into a multi-dimensional space, determine an updated point cloud based on compensating for the motion of the vehicle in the 3D space, and use such data to compensate for the motion of the vehicle in the 2D space. For example, FIG. 3A may illustrate multiple point clouds in a 3D space. In this example, FIG. 3A may include an initial point cloud 318 which may correspond to (or be a 3D representation of) the pixels of the image 314. Each point in the initial point cloud 318 may include a coordinate defining where the point is positioned in the 3D environment with respect to the ToF device or vehicle. In such instances, each pixel in the image 314 may correspond to a point in the initial point cloud 318.

Figure 3A:
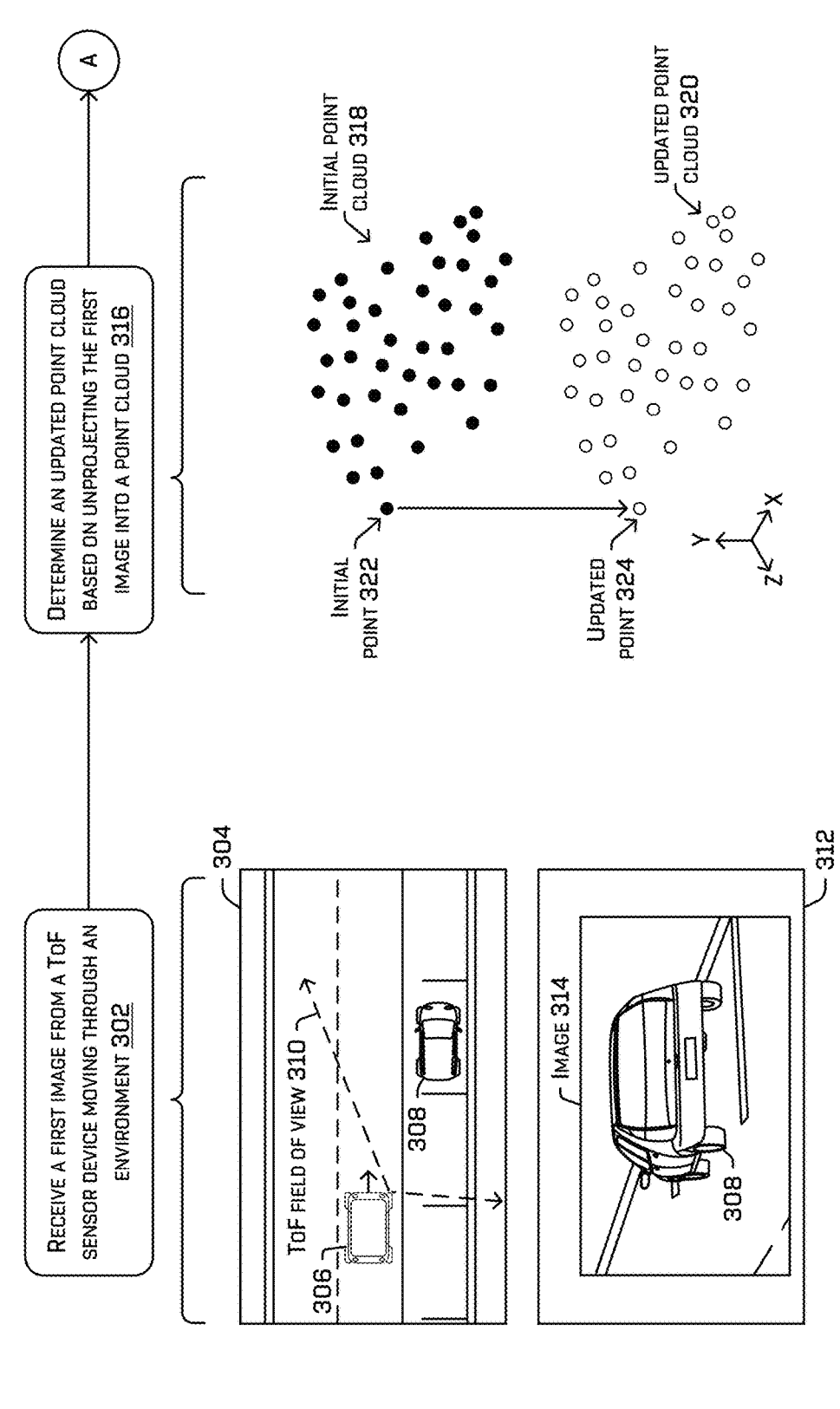

In some examples, FIG. 3A may include an updated point cloud which may represent the updated location of the initial point cloud 318 based on compensating for the motion of the vehicle. That is, the sensor management component may update the position of the points in the initial point cloud 318 to compensate for the motion of the vehicle. Accordingly, the sensor management component may determine a displacement vector which may represent the distance the object 308 moved in the 3D space relative to the vehicle. The displacement vector may be based on the velocity of the vehicle 306 and the exposure time of the ToF device, as described above. Based on determining the displacement vector, the sensor management component may update the position of each point in the initial point cloud 318 based on adding the displacement vector to the point coordinates. In this example, the initial point cloud 318 may include an initial point 322 that, when modified based on the displacement vector, changes location in the 3D space to the position of the updated point 324 of the updated point cloud 320. Such updating operations may be performed for some or all of the points in the initial point cloud 318.

Figure 3B:
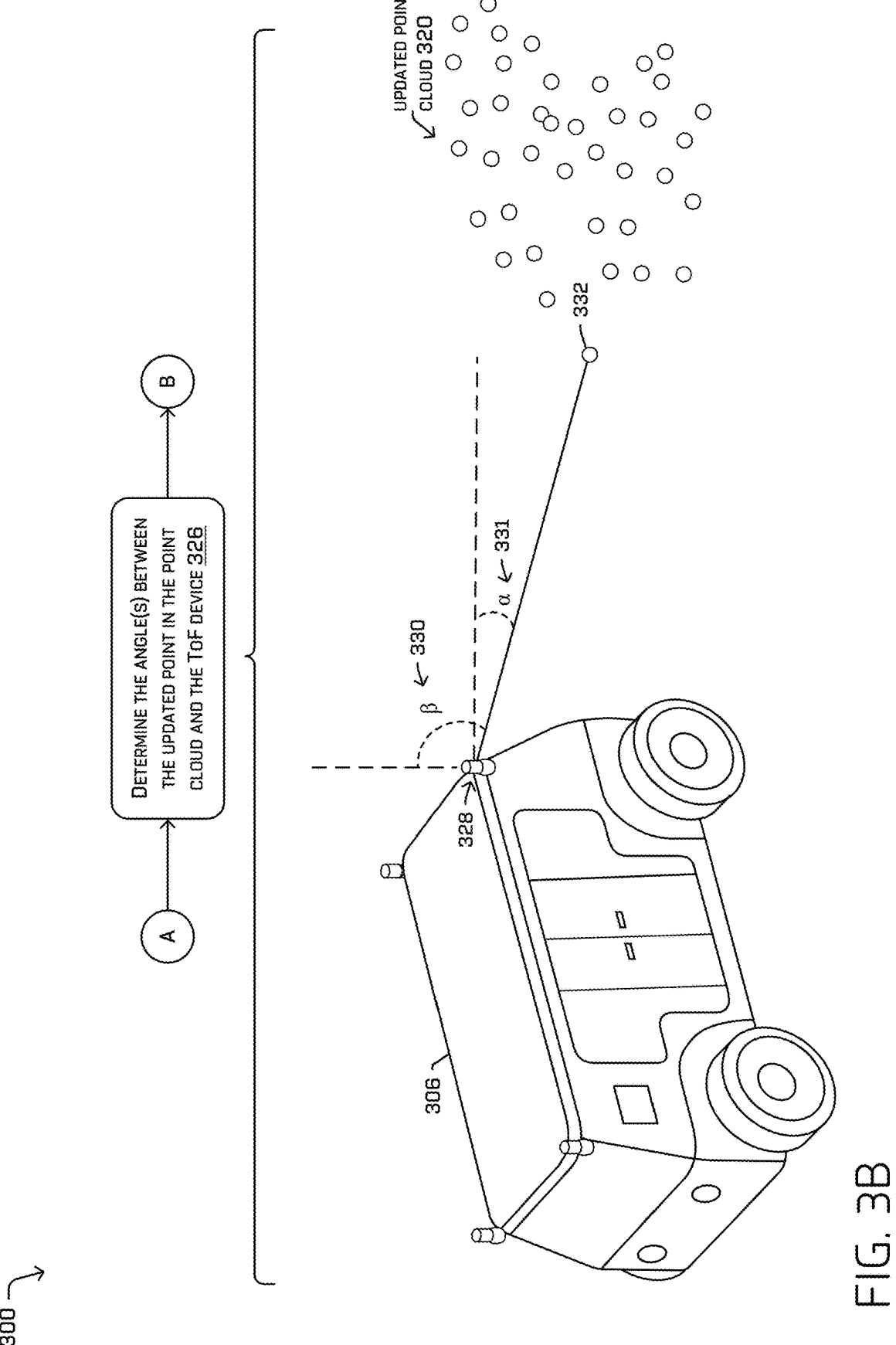

FIG. 3B illustrates an example process for determining angles between a vehicle and a point in a multi-dimensional space.

At operation 326, the sensor management component may determine the angle(s) between the point 332 in the updated point cloud 320 and the ToF device 328. In some examples, the sensor management component may leverage the updated point cloud 320 to determine a motion vector that represents the distance an object moves within the 2D image based on the motion of the vehicle. As described above, the sensor management component may determine the motion vector by subtracting the index of the initial pixel (e.g., the index of the pixel in image 314) from the index of the updated pixel (e.g., the index of the pixel in the imaging plane based on the updated point cloud 320 and that corresponds to the initial pixel). The sensor management component may determine the index of the updated pixel based on the ToF device 328 intrinsics which may indicate, for each pixel in the image, an azimuth and elevation (or polar) angle from which light waves may be received. As such, upon determining the angles of the point in the updated point cloud relative to the ToF device 328, the sensor management component may identify, based on the intrinsics of the ToF device 328, the pixel associated with the angles and the index of the pixel.

For example, FIG. 3B illustrates determining an (beta) angle 330 and an (alpha) angle 331 between the vehicle 306 and a point 332 in the updated point cloud 320. In this example, the vehicle 306 may include a ToF device 328 which may be the same ToF device as described in operation 302. In some instances, the angle 330 may represent an elevation (or polar) angle and the angle 331 may represent the azimuth angle. The sensor management component may determine such angles between each point in the updated point cloud 320 and the ToF device 328.

Figure 3C:
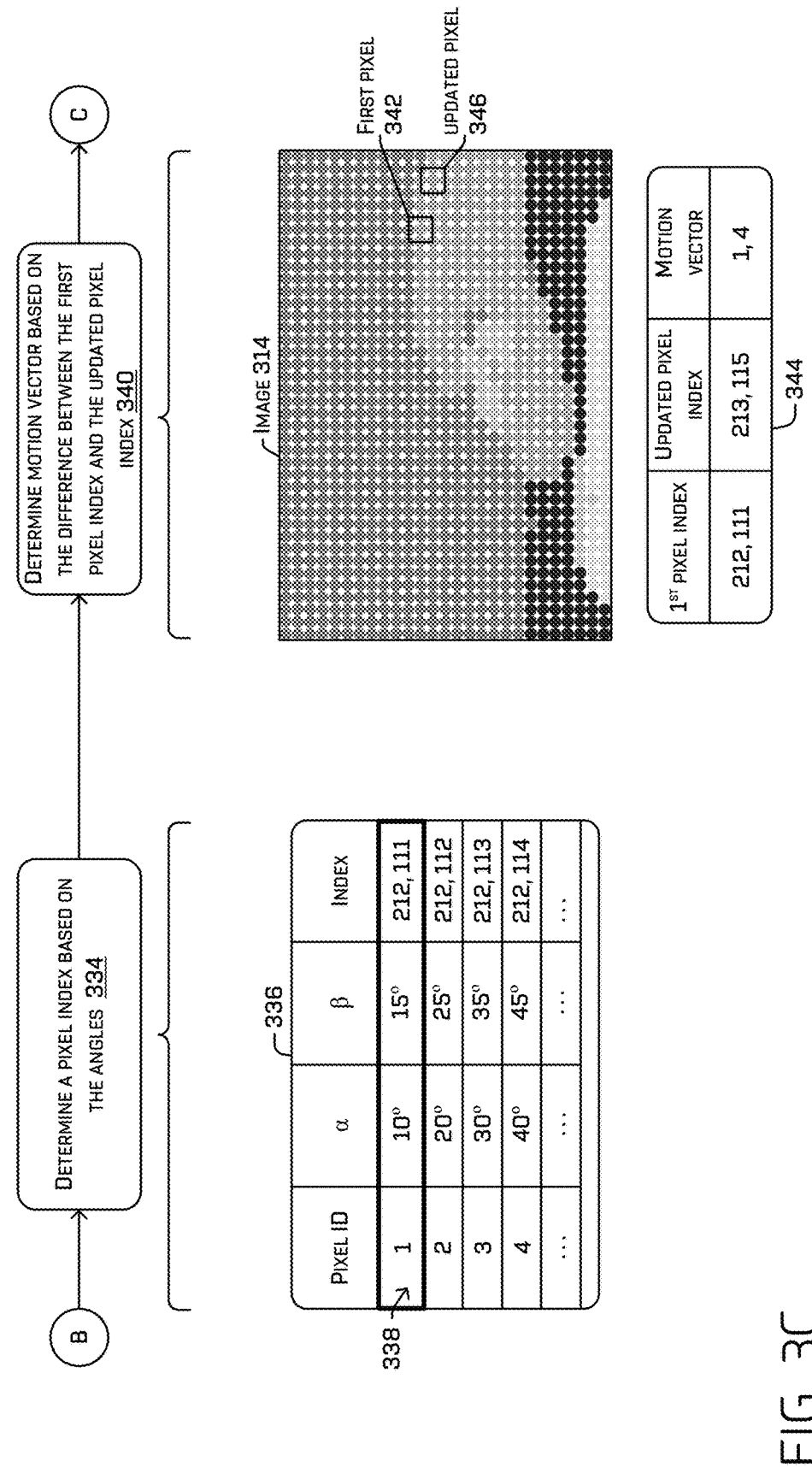

FIG. 3C illustrates an example process for determining a motion vector between original and updated pixel indices.

At operation 334, the sensor management component may determine a pixel index based on the angle 330 and the angle 331. For example, box 336 illustrates pixels and the angles and/or index associated thereto. In this example, the box 336 may include multiple pixels, such as pixel 1, pixel 2, pixel 3, pixel 4, etc. As shown, each pixel may correspond to an alpha angle, a beta angle, and an index. The alpha and beta angles may represent the alpha and beta angles (relative to the ToF device 328) from which light waves may be received from the environment. The index may represent the location of the pixel within the image and/or imaging pane. For example, the first pixel 338 (e.g., pixel 1) may include an alpha angle of 10 degrees, a beta angle of 15 degrees, and correspond to an index of 212, 111. Accordingly, in this example, the angle 330 determined at operation 326 may be 10 degrees and the angle 331 determine at operation 326 may be 15 degrees; however, in other examples, the angles may be any other value. Based on the angle 330 being 10 degrees and the angle 331 being 15 degrees, the sensor management component may determine that the associated pixel (the updated pixel) in the 2D space is the first pixel 338. Based on identifying the pixel associated with the point in the updated point cloud 320 based on the angles between the point and the ToF device 328, the sensor management component may determine that the first pixel 338 index is 212, 111. The first pixel 338 may be an updated pixel based on the updated point cloud.

At operation 340, the sensor management component may determine a motion vector based on the difference between the first pixel index and the updated pixel index. The sensor management component may determine the motion vector by subtracting the index of the original pixel from the index of the updated pixel (e.g., the index of the original pixel location compared to the new location or index of the pixel). For example, FIG. 3C illustrates the image 314 including a plurality of pixels. In this example, the image 314 may be the original image received at operation 302. The sensor management component may identify an index of a pixel (the initial pixel index) in the image 314. In this example, the index of the first pixel 338 may be 212, 111, as illustrated in box 344. Further, the sensor management component may identify to which pixel index the first pixel 342 shifts based on a motion vector. The index of the updated pixel 346 may be 213, 115, as illustrated in box 344. Accordingly, to determine the motion vector, the sensor management component may determine the difference between the index of the first pixel 342 and the index of the updated pixel 346. In this example, the motion vector may be 1, 4.

FIG. 3D illustrates an example process for determining an updated image based on a motion vector and/or generating a composite image.

At operation 348, the sensor management component may determine an updated image that compensates for motion of the ToF device by applying the motion vector to the image. The sensor management component may compensate for the motion of the ToF device by applying the motion vector to the image 314. For example, FIG. 3D illustrates a motion vector 350, the image 314, and an updated image 352. In this example, the motion vector 350 may be the same motion vector determined at operation 340 of FIG. 3C. Accordingly, the motion vector 350 may be 1, 4. In this instance, the sensor management component may apply the motion vector 350 to the image 314. The result of applying the motion vector 350 to the image 314 may be the updated image 352. Determining the updated image 352 may include adding the motion vector 350 (e.g., 1, 4) to the index value of some or all pixels in the image 314. Such operations may modify the location of pixels and the data associated therewith in the imaging plane.

At operation 354, the sensor management component may receive a second image at a second (and later) time. For example, box 356 illustrates atop down perspective of a driving scenario. Specifically, box 356 illustrates the autonomous vehicle 306 navigating the same driving scenario as shown in box 304. However, in box 356, the vehicle 306 may be at a different location in the environment with respect to the object 308. Accordingly, the object 308 may be at a different location in the field of view of the ToF device. Further, as shown in box 358, the object 308 may be located at a different position in the second image 360 than the image 314.

At operation 362, the sensor management component may determine a composite (e.g., high resolution image) based on the second image 360 and the updated image 352. For example, FIG. 3D illustrates the second image 360 being combined with the updated image 352. Combining such images may result in a high resolution image which may be used by the vehicle to determine actions to follow throughout the environment.

FIG. 4 is a pictorial flow diagram illustrating an example process 400 for identifying motion artifacts within an ToF captured image. In this example, some or all operations in the example process 400 may be performed by a sensor management component integrated into a ToF device and/or within a perception component, a prediction component, a planning component, and/or any other components and systems within the autonomous vehicle. Further, the sensor management component described in FIG. 4 may be similar or identical to the sensor management component, as described throughout.

At operation 402, the sensor management component may determine that the difference between pixels meets or exceeds a threshold. As described above, the sensor management component may receive images (e.g., depth images and/or intensity images) captured by a ToF mounted to a moving vehicle. Such images may include a multiple pixels which may contain various types of data, such as depth data, intensity data, angle data, index data, and/or any other type of data. The sensor management component may receive images from the ToF device serially. That is, the sensor management component may receive a first image at a first time (and from a first location in the environment) and a second image at a second (and subsequent) time (and from a second (and different) location in the environment). The sensor management component may determine a high resolution image by combining the first and second images. The sensor management component may generate the high resolution image by compensating for the motion of the vehicle such that the first and second images align (or match) when being combined. However, performing such motion compensation techniques on all pixels within an image may consume excessive computational resources. As such, the sensor management component may identify a subset (or portion) of pixels that are likely to move from one image to a subsequently received image. Performing the motion compensation techniques on a subset of the pixels may reduce computational complexity and/or increase the accuracy of the high resolution image. FIG. 4 may describe the techniques used to identify motion artifacts within an image received and/or determined by a ToF device.

For example, the sensor management component may determine whether the difference between the first pixel depth and the second pixel depth meet or exceed a threshold. As shown, box 404 illustrates multiple depth images and a comparison table. In this example, the box 404 may include a first depth image 406 and a second depth image 408. As described above, the first depth image 406 may correspond to data received from a ToF device at a first time and at a first location within an environment. The second depth image 408 may correspond to data received from the same ToF device (or one or more other ToF devices on the vehicle) at a second time and at a second location. In this example, the second time may be later or subsequent to the first time and the second location may be different than the first location (due to the motion of the ToF device mounted on a moving vehicle). As shown, the first and second depth images may include multiple pixels which may correspond to a specific index in the image.

As shown in FIG. 4, the box 404 may include a comparison table 410. The comparison table 410 may illustrate the depth values and/or the threshold value associated with identifying a motion artifact. Specifically, the comparison table 410 may include a first pixel depth, a second pixel depth, and a threshold value. The first pixel depth may correspond to the depth value of the first pixel 412 of the first depth image 406. The second pixel depth may correspond to the depth value of the second pixel 414 of the second depth image 408. Accordingly, the sensor management component may be comparing the depth measurements of the two pixels at the same index in different images captured at different times. If the difference between the first pixel 412 depth and the second pixel 414 depth is less than the threshold, the sensor management component may determine that the first pixel 412 and/or are the second pixel 414 are not motion artifacts. Conversely, if the difference between the first pixel 412 depth and the second pixel 414 depth meets or exceeds the threshold, the sensor management component may determine that the first pixel 412 and/or are the second pixel 414 are motion artifacts and may need motion compensation in order to combine such images. In this example, the comparison table 410 indicates that the first pixel 412 depth is 10 meters, the second pixel 414 depth is 13 meters, and the threshold is 1 meter. As such, the difference between the first pixel 412 depth and the second pixel 414 depth is 3 meters. Thus, since 3 meters is larger than 1 meter, the sensor management component may determine that the first pixel 412 and/or the second pixel are motion artifacts.

At operation 416, the sensor management component may determine that the intensity values of the pixels meet or exceed a threshold value. In some instances, to ensure that the data associated with each pixel is reliable, the sensor management component may ensure that the pixels identified as motion artifacts have an intensity value that meets or exceeds a threshold value. For example, box 418 illustrates multiple intensity images and a comparison table. In this example, the box 418 may include a first intensity image 420 and a second intensity image 422. As described above, the first intensity image 420 may correspond to data received from a ToF device at the first time and at the first location within the environment. The second intensity image 422 may correspond to data received from the same ToF device (or one or more other ToF devices on the vehicle) at the second time and at the second location. As shown, the first and second intensity images may include multiple pixels which may correspond to a specific index in the image.

As shown in FIG. 4, the box 418 may include a comparison table 424. The comparison table 424 may illustrate the intensity values of the pixels and/or the threshold value associated with ensuring that the pixels are reliable. Specifically, the comparison table 424 may include a first pixel 412 intensity, a second pixel 414 intensity, and the threshold value. The first pixel intensity may correspond to the intensity value of the first pixel 412 of the first intensity image 420. The second pixel intensity may correspond to the intensity value of the second pixel 414 of the second intensity image 422. In some examples, the sensor management component may ensure that the first and second pixels and the data associated therein are reliable based on determining whether the pixel intensity values meet or exceed a threshold value. If the pixel intensity value is less than the threshold, the sensor management component may determine that the first pixel 412 and/or the second pixel 414 are not reliable and as such, the first and second pixels are not motion artifacts. Conversely, if the pixel intensity value meets or exceeds the threshold, the sensor management component may determine that the first pixel 412 and/or the second pixel 414 are reliable and may be tagged as motion artifacts. In this example, the comparison table 424 indicates that the first pixel 412 intensity is 5, the second pixel 414 intensity is 5, and the threshold is 3. As such, since the first pixel 412 intensity and the second pixel 414 intensity are both larger than the threshold, the sensor management component may determine that the first pixel 412 and/or the second pixel are reliable pixels.

At operation 426, the sensor management component may determine that the pixel(s) are a motion artifact based on the depth difference (as determined at operation 402) and the intensity values (as determined at operation 416). As discussed above, the sensor management component may determine that pixels with a depth difference that meets or exceeds a threshold value as well as intensity values that meet or exceed a threshold value are reliable motion artifacts. For example, box 428 illustrates a motion artifact image 430. In this example, the motion artifact image 430 may illustrate which pixels are tagged (or otherwise identified) as motion artifacts. As shown, pixel(s) that are motion artifacts may be illustrated as white pixels whereas non-motion artifact 434 pixel(s) may be illustrated as black pixels. In this example, the motion artifact image 430 may include a motion artifact 432 pixel that corresponds to the same index as the first and/or second pixels described above.

At operation 436, the sensor management component may determine a motion artifact buffer surrounding the motion artifact 432 pixel. In some examples, the sensor management component may tag addition pixels surrounding the motion artifact 432 pixel as motion artifacts. For example, box 438 illustrates the motion artifact image 430. In this example, the motion artifact image 430 may include an increased number of motion artifact pixels 440. As shown in box 428, the motion artifact image 430 may include a single motion artifact 432 pixel whereas the motion artifact image 430 within the box 438 may include multiple motion artifact pixels 440. In this example, the sensor management component increased the number (e.g., generate a buffer of motion artifacts) of motion artifact pixels by tagging two layers of pixels surrounding the motion artifact 432 pixel as motion artifacts. However, that is not intended to be limiting; in other examples, the sensor management component may tag more or fewer pixels as motion artifacts.

At operation 442, the sensor management component may perform motion compensation on the motion artifact pixels 440, as determined at operation 426 and/or operation 436. In such instances, the sensor management component may perform the motion compensation techniques on the motion artifact pixels 440 while not performing such techniques on pixels that are identified (or tagged) as non-motion artifacts. Additional detail discussing performing motion compensation are discussed with respect to FIGS. 1-3D.

Additionally or alternatively, the sensor management component may identify motion artifacts by determining an intensity ratio. That is, the sensor management component may identify a motion artifact by determining an intensity ratio between the first pixel 412 in the first intensity image 420 and the second pixel 414 in the second intensity image 422. Based on determining the intensity ratio, the sensor management component may compare the intensity ratio to a threshold (e.g., based on a distance to the object (e.g., the threshold may increase with a larger distance)) to determine whether the intensity ratio satisfies the threshold. If the intensity ratio meets or exceeds the threshold, the sensor management component may determine that the first and second pixels may not be motion artifacts. In contrast, if the intensity ratio is below the threshold, the sensor management component may determine that the first and second pixels may be motion artifacts.

Figure 5:
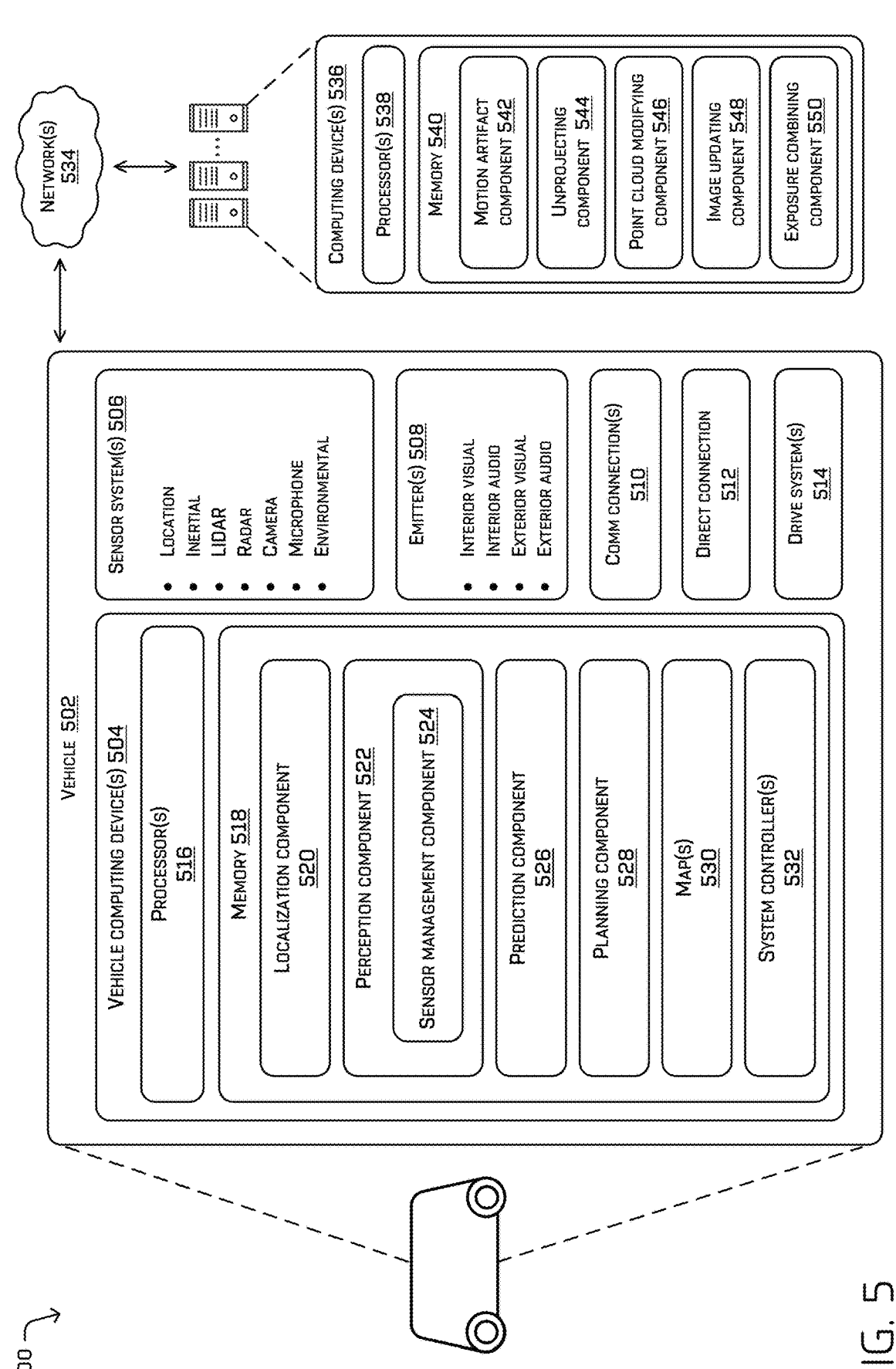
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522 including a sensor management component 524, a prediction component 526, a planner component 528, one or more system controllers 532, and one or more maps 530 (or map data). Though depicted in FIG. 6 as residing in the memory 518 for illustrative purposes, it is contemplated that the localization component 520, the perception component 522 including the sensor management component 524, the prediction component 526, the planner component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include a motion artifact component 542, an unprojecting component 544, a point cloud modifying component 546, an image updating component 548, and an exposure combining component 550.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior. Additionally, the prediction component 526 may be perform any of the techniques described with respect to any of FIGS. 1-6 above with respect to receiving, retrieving, determining, and/or generating predicted trajectories for object(s) within the environment.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 502 to a safe stop avoiding all collisions and/or otherwise mitigating damage.

The sensor management component 524 may perform any of the techniques described with respect to any of FIGS. 1-4 above with respect to determining composite sensor data based on compensating for the motion of a vehicle.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the sensor management component 524, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the sensor management component 524, the prediction component 526, the planner component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a motion artifact component 542, an unprojecting component 544, a point cloud modifying component 546, an image updating component 548, and an exposure combining component 550. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the motion artifact component 542, the unprojecting component 544, the point cloud modifying component 546, the image updating component

548, and the exposure combining component 550 may perform substantially similar functions as the sensor management component 524.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 6 is a flow diagram illustrating an example process 600 of for receiving a first image, unprojecting the first image into a point cloud, updating the point cloud, determining a motion vector based on the updated point cloud, determining an updated image based on applying the motion vector to the first image, determining a composite image based on the updated image and second sensor data, and controlling the vehicle based on the composite image. As described below, the example process 600 may be performed by one or more computer computer-based components configured to implement various functionalities described herein. For instance, process 600 may be performed by a sensor management component 202. As described above, the sensor management component 202 may be integrated as an on-vehicle system. However, in other examples, the sensor management component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operations 602, the sensor management component may receive, from a ToF device, a first image including a first set of pixels and a second image including a second set of pixels. In some examples, a vehicle may include one or more sensor devices mounted at various locations. Such sensor devices may be configured to capture data representative of the environment proximate the vehicle. In some instances, one or more of the sensor devices may be a ToF sensor device. The ToF sensor device(s) may include one or more emitters configured to emit continuous, modulated light signals into the environment. Such signals may reflect off various objects in the environment prior to returning to a sensor receiver of the ToF sensor device.

In some examples, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor management component (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In such instances, the intensity image and the depth image may be represented in the two-dimensional space (or domain).

At operations 604, the sensor management component may determine whether the first and second sets of pixels include motion artifacts. The sensor management component may evaluate the first and second pixels to determine whether such data includes motion artifacts. A motion artifact may be a pixel that includes data likely to move locations in the imaging plane from one image to a subsequently captured image. The sensor management component may identify motion artifacts by comparing the depth values between two images. The sensor management component may identify a first pixel at a specific index in the first image and second pixel at the same index in the second image. The sensor management component may compare the depth value of the first pixel with the depth value of the second pixel. If the result of the comparison is below a threshold (604:No), the sensor management component may determine that the first and second pixels may be considered non-motion artifacts. That is, at operation 606, the sensor management component may exclude the first and second pixels from the motion compensation techniques described above.

In contrast, if the result of the comparison meets or exceeds a threshold (604:Yes), the sensor management component may determine that such pixels are motion artifacts. Accordingly, at operation 608, the sensor management component may determine a point cloud based on unprojecting the pixels of the first image into a point cloud. The unprojection operation may covert a 2D image into a 3D point cloud. In this example, unprojecting the first image may convert the pixels (of the first image) from the 2D space into a point in a multi-dimensional point cloud where each point in the point cloud has a coordinate (e.g., x-position, a y-position, and a z-position). The sensor management component may unproject the first image based on one or more intrinsics of the ToF device. In this example, the ToF device intrinsics may indicate that an image captured by the ToF device may include an imaging plane of 360×480 pixels. Of course, in other examples the dimensions and/or the number of pixels of the imaging plane may differ. In this instance, the intrinsics may identify, for each pixel in the imaging plane, the angle (e.g., azimuthal and/or polar angle) from which light waves are received from the 3D environment. For example, the intrinsics may indicate that any light being received by the ToF device from an angle of 30 degrees azimuth and 35 degrees elevation (relative to the ToF device) will be represented in the imaging plane at pixel X (e.g., index 90, 90). Accordingly, each pixel in the image may include an angle measurement (e.g., indicating the angles from which light is received), a depth measurement (e.g., indicating the depth of the surface from which the light signal reflected), and/or an intensity value (e.g., indicating the degree of reflectivity of the surface). As such, when the sensor management component unprojects the first image, the sensor management component may use the angles and depth measurements of the pixels to determine the coordinates of each point in the point cloud.

At operations 610, the sensor management component may determine an updated point cloud. In some examples, the sensor management component may update (or modify) the position of the point cloud based on a displacement vector (e.g., based on the vehicle velocity and the exposure time). Updating the position of the point cloud may result in shifting the location of the points in the point cloud to compensate (or account) for the motion of the vehicle. As noted above, the points in the point cloud may include a coordinate (e.g., x-position, a y-position, and a z-position) relative to the ToF device or the vehicle. In this example, the sensor management component may update the points by updating the x-position (or the y-position and/or the z-position) of each point based on the displacement vector. That is, the sensor management component may add the displacement vector value to the x-position value which may result in shifting the position of the point in the 3D space. The sensor management component may perform such operations on some or all points in the point cloud. Accordingly, the sensor management component may determine an updated point cloud based on applying the displacement vector to the points in the point cloud.

At operations 612, the sensor management component may determine a motion vector based on the updated point cloud and the first image. In such instances, the sensor management component may determine the motion vector based on subtracting the updated pixel index from the original pixel index. The sensor management component may identify the updated pixel index based on leveraging ToF device intrinsic data. As described above, the intrinsics of a ToF device may indicate, for each pixel in the imaging plane, the azimuth and elevation angles from which light waves are received. That is, each pixel in the image may include angle data indicating the azimuth and elevation angle from which the data stored therein may be located in the 3D environment. Accordingly, the sensor management component may determine the angles from a point in the updated point cloud to the ToF device. Based on determining the angle corresponding to the point in the updated point cloud, the sensor management component may access ToF device intrinsic data to determine which pixel in the first image has an angles similar or identical to the angles corresponding to the point in the updated point cloud. In such instances, based on identifying the corresponding pixel in the first image, the sensor management component may identify the index of the pixel which may be indicative of the updated pixel index. The updated pixel index may represent the updated location of the data from the environment based on the motion of the vehicle. Accordingly, the sensor management component may determine the motion vector by subtracting the updated pixel index from the original pixel index. The difference of the pixel indices may be the motion vector.

At operations 614, the sensor management component may determine an updated image based on applying the motion vector to the first image. Applying the motion vector into the first image may cause the pixels and the data stored therein to shift within the image pane. The sensor management component may determine the updated image based on adding the data of the motion vector to the indices of the pixels in the first image. The resulting updated image may include the object(s) from the first image but at different locations within the image pane of the updated image. That is, the locations of the object(s) in the updated image may correspond to those of the second image (which was captured at a subsequent time from the first image).

At operations 616, the sensor management component may determine a composite image that compensates for the motion of the ToF device over time based on the updated image and the second image. Based on determining the updated image, the sensor management component may perform image combining techniques to combine the updated image with the second image. Though the updated image was captured at a previous time, the motion compensation techniques described above may update the pixels and the data stored therein to ensure that the updated image and the second image are similar or identical.

At operation 618, the vehicle can be controlled based on the composite image. In some examples, upon generating the composite image, the sensor management component may send the composite image to one or more downstream processing components or systems. Such components or systems may include one or more additional perception components, one or more prediction components, and/or one or more planning components. As such, the vehicle may determine or otherwise plan vehicle actions based on the composite image.

Example Clauses

A: A system comprising: one or more processors; and one or more non-transitory computer-readable media storing computer-executable instructions that, when executed, cause the system to perform operations comprising: receiving first sensor data associated with a first image generated by a time-of-flight device at a first time, the first sensor data comprising a set of pixels; determining, based at least in part on unprojecting the set of pixels to a three-dimensional domain, a set of points; determining, based at least in part on velocity data of a vehicle and a time associated with the first image, a displacement vector; determining, based at least in part on the displacement vector, a modified set of points associated with the set of points; determining, based at least in part on the modified set of points and the time-of-flight device, a motion vector; determining, based at least in part on the motion vector and the first image, an updated image; receiving second sensor data associated with a second image generated by the time-of-flight device at a second time that is after the first time; generating, based at least in part on the updated image and the second sensor data, a composite image that compensates for motion of the time-of-flight device over time; and controlling the vehicle based at least in part on the composite image.

B: The system of paragraph A, wherein determining the motion vector comprises: determining a first index of a pixel associated with the set of pixels, the first index associated with an angle from the time-of-flight device to a point in the set of points; determining, based at least in part on the angle, a second index of an updated pixel, the updated pixel being associated with the pixel and the point; and determining, based at least in part on the first index and the second index, the motion vector.

C: The system of paragraph B, wherein determining the motion vector comprises: determining, as the motion vector, a difference between the first index and the second index.

D: The system of paragraph A, the operations further comprising: identifying a first pixel at an index in the first image and a second pixel at the index in the second image; and determining, based at least in part on comparing a first depth associated with the first pixel with a second depth associated with the second pixel, that the first pixel is a motion artifact, wherein generating the composite image is further based at least in part on the first pixel being a motion artifact.

E: The system of paragraph A, wherein the velocity data is determined based at least in part on: receiving, from a component of the vehicle external to the time-of-flight device, the velocity data.

F: One or more non-transitory computer-readable media storing instructions executable by one or more processors, wherein the instructions, when executed, cause a system to perform operations comprising: receiving first sensor data associated with a first image generated by a sensor device; determining, based at least in part a portion of the first image, a set of three-dimensional points in an environment; determining, based at least in part on a displacement vector, a modified set of points associated with the set of three-dimensional points; determining, based at least in part on the modified set of points, an updated image; receiving second sensor data associated with a second image generated by the sensor device; and generating, based at least in part on the updated image and the second sensor data, a composite image that compensates for motion of the sensor device over time.

G: The one or more non-transitory computer-readable media of paragraph F, the operations further comprising: determining a first index of a pixel associated with the first image; determining an angle associated with the pixel; determining, based at least in part on the angle and the modified set of points, a second index of an updated pixel; and determining, based at least in part on the first index and the second index, a motion vector; and determining, based at least in part on the motion vector and the first image, the updated image.

H: The one or more non-transitory computer-readable media of paragraph G, wherein determining the motion vector is further based at least in part on: determining, as the motion vector, a difference between the first index and the second index.

I: The one or more non-transitory computer-readable media of paragraph F, wherein unprojecting the set of pixels is based at least in part on: identifying a first pixel at an index in the first image and a second pixel at the index in the second image; and determining, based at least in part on comparing a first depth associated with the first pixel with a second depth associated with the second pixel, a difference; determining, based at least in part on the difference meeting or exceeding a threshold, that the first pixel is a motion artifact.

J: The one or more non-transitory computer-readable media of paragraph F, wherein the sensor device is a time-of-flight device.

K: The one or more non-transitory computer-readable media of paragraph F, wherein determining the modified set of points is based at least in part on: determining, based at least in part on velocity data of a vehicle and a time associated with the first image, a displacement vector; and determining, based at least in part on the displacement vector, the modified set of points.

L: The one or more non-transitory computer-readable media of paragraph K, wherein the velocity data is determined based at least in part on: receiving, from a component of the vehicle external to the sensor device, the velocity data.

M: The one or more non-transitory computer-readable media of paragraph F, the operations further comprising: controlling a vehicle based at least in part on the composite image.

N: A method comprising: receiving first sensor data associated with a first image generated by a sensor device; determining, based at least in part a portion of the first image, a set of three-dimensional points in an environment; determining, based at least in part on a displacement vector, a modified set of points associated with the set of three-dimensional points; determining, based at least in part on the modified set of points, an updated image; receiving second sensor data associated with a second image generated by the sensor device; and generating, based at least in part on the updated image and the second sensor data, a composite image that compensates for motion of the sensor device over time.

O: The method of paragraph N, further comprising: determining a first index of a pixel associated with the first image; determining an angle associated with the pixel; determining, based at least in part on the angle and the modified set of points, a second index of an updated pixel; and determining, based at least in part on the first index and the second index, a motion vector; and determining, based at least in part on the motion vector and the first image, the updated image.

P: The method of paragraph O, wherein determining the motion vector is further based at least in part on: determining, as the motion vector, a difference between the first index and the second index.

Q: The method of paragraph N, wherein unprojecting the set of pixels is based at least in part on: identifying a first pixel at an index in the first image and a second pixel at the index in the second image; and determining, based at least in part on comparing a first depth associated with the first pixel with a second depth associated with the second pixel, a difference; determining, based at least in part on the difference meeting or exceeding a threshold, that the first pixel is a motion artifact.

R: The method of paragraph N, wherein the sensor device is a time-of-flight device.

S: The method of paragraph N, wherein determining the modified set of points is based at least in part on: determining, based at least in part on velocity data of a vehicle and a time associated with the first image, a displacement vector; and determining, based at least in part on the displacement vector, the modified set of points.

T: The method of paragraph S, wherein the velocity data is determined based at least in part on: receiving, from a component of the vehicle external to the sensor device, the velocity data.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

receiving first sensor data associated with a first image generated by a time-of-flight device at a first time, the first sensor data comprising a set of pixels;

determining, based at least in part on unprojecting the set of pixels to a three-dimensional domain, a set of points;

determining, based at least in part on velocity data of a vehicle and a third time associated with the first image, a displacement vector;

determining, based at least in part on the displacement vector, a modified set of points associated with the set of points;

determining, based at least in part on the modified set of points and the time-of-flight device, a motion vector, wherein determining the motion vector further comprises:

determining a first index of a pixel associated with the set of pixels, the first index associated with a first angle from the time-of-flight device to a point in the set of points;

determining, based at least in part on a second angle, a second index of an updated pixel, the updated pixel being associated with the pixel and the point; and determining, based at least in part on the first index and the second index, the motion vector;

determining, based at least in part on the motion vector and the first image, an updated image;

receiving second sensor data associated with a second image generated by the time-of-flight device at a second time that is after the first time;

generating, based at least in part on the updated image and the second sensor data, a composite image that compensates for motion of the time-of-flight device over time; and controlling the vehicle based at least in part on the composite image.

2. The system of claim 1, wherein determining the motion vector comprises:

determining, as the motion vector, a difference between the first index and the second index.

3. The system of claim 1, the operations further comprising:

identifying a second pixel at third index in the first image and a third pixel at the third index in the second image; and determining, based at least in part on comparing a first depth associated with the second pixel with a second depth associated with the third pixel, that the second pixel is a motion artifact, wherein generating the composite image is further based at least in part on the second pixel being a motion artifact.

4. The system of claim 1, wherein the velocity data is determined based at least in part on:

receiving, from a component of the vehicle external to the time-of-flight device, the velocity data.

5. One or more non transitory computer readable media storing instructions executable by one or more processors, wherein the instructions, when executed, cause a system to perform operations comprising:

receiving first sensor data associated with a first image generated by a sensor device;

determining, based at least in part a portion of the first image, a set of three-dimensional points in an environment;

determining, based at least in part on a displacement vector, a modified set of points associated with the set of three-dimensional points;

determining, based at least in part on the modified set of points and the sensor device, a motion vector, wherein determining the motion vector further comprises:

determining a first index of a pixel associated with a set of pixels associated with the first image, the first index associated with a first angle from the sensor device to a point in the set of three-dimensional points;

determining, based at least in part on a second angle, a second index of an updated pixel, the updated pixel being associated with the pixel and the point; and determining, based at least in part on the first index and the second index, the motion vector;

determining, based at least in part on the motion vector and the first image, an updated image;

receiving second sensor data associated with a second image generated by the sensor device; and generating, based at least in part on the updated image and the second sensor data, a composite image that compensates for motion of the sensor device over time.

6. The one or more non transitory computer readable media of claim 5, wherein determining the motion vector is further based at least in part on:

determining, as the motion vector, a difference between the first index and the second index.

7. The one or more non transitory computer readable media of claim 5, wherein unprojecting the set of pixels is based at least in part on:

identifying a second pixel at third index in the first image and a third pixel at the third index in the second image;

determining, based at least in part on comparing a first depth associated with the second pixel with a second depth associated with the third pixel, a difference; and determining, based at least in part on the difference meeting or exceeding a threshold, that the second pixel is a motion artifact.

8. The one or more non transitory computer readable media of claim 5, wherein the sensor device is a time-of-flight device.

9. The one or more non transitory computer readable media of claim 5, wherein determining the modified set of points is based at least in part on:

determining, based at least in part on velocity data of a vehicle and a time associated with the first image, the displacement vector; and determining, based at least in part on the displacement vector, the modified set of points.

10. The one or more non transitory computer readable media of claim 9, wherein the velocity data is determined based at least in part on:

receiving, from a component of the vehicle external to the sensor device, the velocity data.

11. The one or more non transitory computer readable media of claim 5, the operations further comprising:

controlling a vehicle based at least in part on the composite image.

12. A method comprising:

receiving first sensor data associated with a first image generated by a sensor device;

determining, based at least in part a portion of the first image, a set of three-dimensional points in an environment;

determining, based at least in part on a displacement vector, a modified set of points associated with the set of three-dimensional points;

determining, based at least in part on the modified set of points and the sensor device, a motion vector, wherein determining the motion vector further comprises:

determining a first index of a pixel associated with a set of pixels associated with the first image, the first index associated with a first angle from the sensor device to a point in the set of three-dimensional points;

determining, based at least in part on a second angle, a second index of an updated pixel, the updated pixel being associated with the pixel and the point; and determining, based at least in part on the first index and the second index, the motion vector;

determining, based at least in part on the motion vector and the first image, an updated image;

receiving second sensor data associated with a second image generated by the sensor device; and generating, based at least in part on the updated image and the second sensor data, a composite image that compensates for motion of the sensor device over time.

13. The method of claim 12, wherein determining the motion vector is further based at least in part on:

determining, as the motion vector, a difference between the first index and the second index.

14. The method of claim 1, wherein unprojecting the set of pixels is based at least in part on:

identifying a second pixel at third index in the first image and a third pixel at the third index in the second image;

determining, based at least in part on comparing a first depth associated with the second pixel with a second depth associated with the third pixel, a difference; and determining, based at least in part on the difference meeting or exceeding a threshold, that the second pixel is a motion artifact.

15. The method of claim 12, wherein the sensor device is a time-of-flight device.

16. The method of claim 12, wherein determining the modified set of points is based at least in part on:

determining, based at least in part on velocity data of a vehicle and a time associated with the first image, the displacement vector; and determining, based at least in part on the displacement vector, the modified set of points.

17. The method of claim 16, wherein the velocity data is determined based at least in part on:

receiving, from a component of the vehicle external to the sensor device, the velocity data.

18. The system of claim 3, wherein determining that the second pixel is the motion artifact further comprises:

determining, based at least in part on comparing the first depth associated with the second pixel with the second depth associated with the third pixel, a difference; and determining, based at least in part on the difference meeting or exceeding a threshold, that the second pixel is the motion artifact.

19. The one or more non transitory computer readable media of claim 7, wherein generating the composite image is further based at least in part on the second pixel being the motion artifact.

20. The method of claim 14, wherein generating the composite image is further based at least in part on the second pixel being the motion artifact.

\* \* \* \* \*